(12) United States Patent
Kramer et al.

(10) Patent No.: US 9,297,995 B2
(45) Date of Patent: Mar. 29, 2016

(54) AUTOMATIC STEREOLOGICAL ANALYSIS OF BIOLOGICAL TISSUE INCLUDING SECTION THICKNESS DETERMINATION

(75) Inventors: Kurt A. Kramer, Port Richey, FL (US); Peter R. Mouton, St. Petersburg, FL (US); Lawrence O. Hall, Tampa, FL (US); Dmitry Goldgof, Lutz, FL (US); Daniel T. Elozory, Tampa, FL (US); Om Pavithra Bonam, Wesley Chapel, FL (US); Baishali Chaudhury, Tampa, FL (US)

(73) Assignees: UNIVERSITY OF SOUTH FLORIDA, Tampa, FL (US); STEREOLOGY RESOURCE CENTER, INC., Chester, MD (US)

( * ) Notice: Subject to any disclaimer, the term of this patent is extended or adjusted under 35 U.S.C. 154(b) by 1072 days.

(21) Appl. No.: 13/371,889

(22) Filed: Feb. 13, 2012

(65) Prior Publication Data

US 2012/0236120 A1    Sep. 20, 2012

Related U.S. Application Data

(60) Provisional application No. 61/441,832, filed on Feb. 11, 2011.

(51) Int. Cl.
| | |
|---|---|
| *H04N 13/02* | (2006.01) |
| *G02B 21/36* | (2006.01) |
| *G02B 21/00* | (2006.01) |
| *G06T 5/50* | (2006.01) |
| *G06T 7/00* | (2006.01) |
| *G06K 9/00* | (2006.01) |

(52) U.S. Cl.
CPC .......... *G02B 21/367* (2013.01); *G02B 21/0004* (2013.01); *G06K 9/00134* (2013.01); *G06T 5/50* (2013.01); *G06T 7/0081* (2013.01); *G06T 7/0097* (2013.01); *G06T 2207/10024* (2013.01); *G06T 2207/20141* (2013.01); *G06T 2207/20148* (2013.01); *G06T 2207/30024* (2013.01)

(58) Field of Classification Search
CPC ............. G02B 21/367; G02B 21/0004; G06K 9/00134; G06T 7/0097; G06T 7/0081; G06T 5/50; G06T 2207/30024; G06T 2207/20148; G06T 2207/10024; G06T 2207/20141
USPC .............................................. 348/46; 345/420
See application file for complete search history.

(56) References Cited

U.S. PATENT DOCUMENTS 7,528,830 B2 *  5/2009  Redert ........................ 345/420

* cited by examiner

*Primary Examiner* — Allen Wong
(74) *Attorney, Agent, or Firm* — Saliwanchik, Lloyd & Eisenschenk

(57) ABSTRACT

Systems and methods are provided for automatic determination of slice thickness of an image stack in a computerized stereology system, as well as automatic quantification of biological objects of interest within an identified slice of the image stack. Top and bottom boundaries of a slice can be identified by applying a thresholded focus function to determine just-out-of-focus focal planes. Objects within an identified slice can be quantified by performing a color processing segmentation followed by a gray-level processing segmentation. The two segmentation processes generate unique identifiers for features in an image that can then be used to produce a count of the features.

23 Claims, 19 Drawing Sheets

AUTOMATIC STEREOLOGICAL ANALYSIS OF BIOLOGICAL TISSUE INCLUDING SECTION THICKNESS DETERMINATION

CROSS-REFERENCE TO RELATED APPLICATION

This application claims the benefit of U.S. provisional application Ser. No. 61/441,832, filed Feb. 11, 2011, which is herein incorporated by reference in its entirety.

This invention was made with government support under grant number R44 MH076541-04 awarded by the National Institutes of Health/National Institute of Allergy and Infectious Diseases. The government has certain rights in the invention.

BACKGROUND

Unbiased stereology is used to quantify properties of a higher dimensional (e.g., 3D) object by viewing a lower dimensional (e.g., 2D) section of the object. Computer based stereology systems acquire data from 3D structures and have been primarily developed to extract an unbiased estimation of geometric properties including length, area, volume, and population size of objects within a biological sample. Biological applications of stereology include the unbiased estimation of a regional volume of tissue, surface area and length of cells and curvilinear fibers, and a total number of cells (objects of interest) in a defined reference space (region of interest).

Current computerized stereology systems enable mapping of anatomical regions by requiring a user to carry out several manual, non-automated steps when generating estimates of first- and second-order stereological parameters of biological microstructures.

For example, section or slice thickness determination is currently carried out by a user performing manual adjustments using the microscope's fine focusing mechanism to locate the boundaries of slice.

In addition, a user may also be required to manually locate and select objects of interest while stepping through stained tissue sections in order to perform quantitative analysis of biological microstructures.

For example, stereology often involves the application of assumption- and model-free (unbiased) geometric probes overlaid on stained tissue sections sampled in an unbiased systematic-random manner. Geometric probes for stereology studies include regional probes such as lines, points, spheres, and disectors placed at random with respect to the biological objects within an anatomically defined reference space; and local probes such as the nucleator, rotator, and point-sampled intersects that are placed with respect to sampled object of interest. The biological objects of interest generally include cells, fibers, blood vessels, and other features that can be found in a tissue. In practice, trained technicians recognize and indicate the intersections between each probe and the biological objects using a software tool, and the software tool calculates sample parameters for the desired first-order (number, length, surface area, volume) and second-order (variation, spatial distribution) parameters.

Computerization and automation of these processes would be a significant advance toward fully automated applications of design-based stereology for biological tissue analysis.

BRIEF SUMMARY

Systems and methods are described herein for quantitative analysis of biological microstructures using unbiased stereology. According to one embodiment, systems and methods are provided that can automatically segment images within a region of interest to determine the top and bottom of an image slice and then undergo steps to detect and quantify biological objects of interest.

In one embodiment of the invention, just-out-of-focus planes that bound an in-focus optical plane are used to enable automatic detection of the top and bottom surfaces of a tissue sample slice and determine the boundaries and thickness of a tissue slice.

According to one aspect, a system is provided that can automatically locate the top and bottom surface of a section of stained tissue, and then repeat this process at multiple X-Y locations within an anatomically defined reference space. Locating the top and bottom surface enables correct automatic placement of geometric probes for stereology, as well as automatic determination of the section thickness.

According to another aspect, an autofocusing method is provided that defines the upper and lower surfaces of a section of stained tissue as the "just-out-of-focus" optical planes. Just-out-of-focus optical planes refer to the optical planes above and below first in-focus optical planes. In one embodiment, the top, bottom, and thickness of biological objects of interest (or slices of a biological object of interest) are determined by locating the in-focus optical planes at the upper and lower surfaces of stained biological objects of interest and then locating the start and end of each tissue section by locating the just out of focus optical planes through tissue sections along the Z-axis of the stained biological objects of interest.

The performance of the system and method providing automatic surface location can be optimized by training the automated surface location system and method across a range of threshold parameters. The steps for automated surface location includes an autofocusing method that uses a focus function. For optimization, the focus function for the autofocusing method undergoes a thresholding of the focus function output (i.e., the focus measure or focus threshold).

The focus functions of various embodiments of the invention utilize a pixel-to-pixel contrast threshold (and can be referred as a thresholded function). In one embodiment, the Nelder Mead simplex optimization method for two dimensional parameter spaces is used to find the optimal pixel-to-pixel contrast threshold, which was paired with the total image focus threshold to yield a focus function with the lowest average error rate. Of course, embodiments are not limited to the use of the Nelmder Mead simplex optimization method.

In a further embodiment providing automatic quantifying of biological objects of interest within a sample, an image slice undergoes color processing to establish a threshold and then the image slice undergoes gray level processing using the established threshold to count first and second order parameters in the image slice.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6A shows an image in the stack collected at a grid point; FIG. 6B shows an image in the stack with cells of interest painted in black for training; FIG. 6C shows a color thresholded image; FIG. 6D shows an image processed with a fill-hole filter; and FIG. 6E shows an image processed with a connected component analysis.

FIG. 7A shows an original (color) image with four cells highlighted; FIG. 7B shows an image converted to gray-level after color thresholding and the same cells highlighted as the original image shown in FIG. 7A; FIG. 7C shows an iterative binarized image with the four cells highlighted; and FIG. 7C shows an image with a region grown and all the cells that are identified highlighted with a bounding box.

DETAILED DISCLOSURE OF THE INVENTION

Systems and methods are provided for quantitative analysis of biological microstructures using unbiased stereology. According to certain embodiments, a system is provided that can automatically locate the top and bottom surface of a section of stained tissue (Z-direction), and then repeat this process at multiple X-Y locations within an anatomically defined reference space. Locating the top and bottom surface enables correct automatic placement of geometric probes for stereology, as well as automatic determination of the section thickness.

Figure 1:
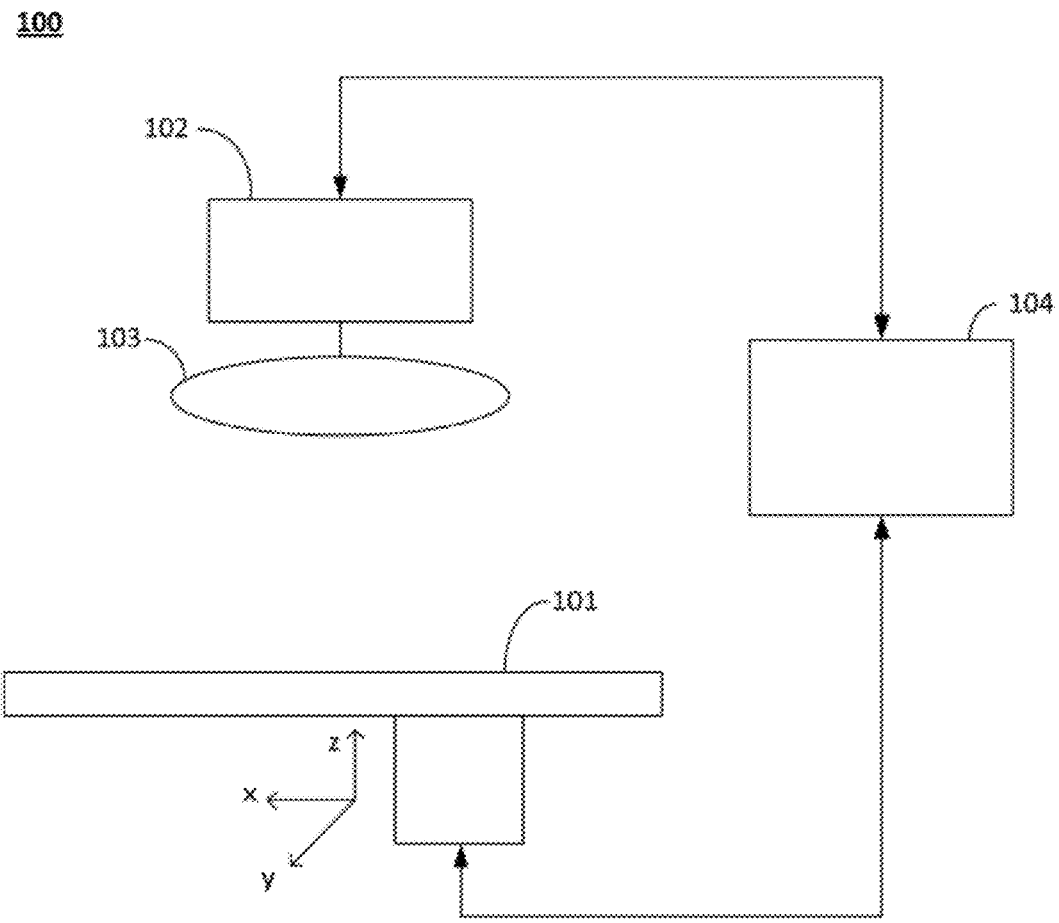
FIG. 1 shows a representational diagram of a computerized stereological system in accordance with an embodiment of the invention.

FIG. 1 shows a representational diagram of a computerized stereological system in accordance with an embodiment of the invention. Referring to FIG. 1, a computerized stereological system 100 can include a motorized X-Y-Z stage 101 on which biological sample is placed; a digital image capture device 102 for capturing images of the biological sample; a microscope lens configuration 103 that is either part of a microscope or provided as lens components of the digital image capture device 102 for magnifying portions of the biological sample; and a controller 104. The controller 104 can be configured to control the digital image capture device 102 and the motorized X-Y-Z stage 101. In a further embodiment, the controller can also be configured for automated control of the microscope lens configuration 103. A variety of processing steps can be carried out via the controller 104, which can be implemented as a processor with connected memory and other storage devices.

Figure 2:
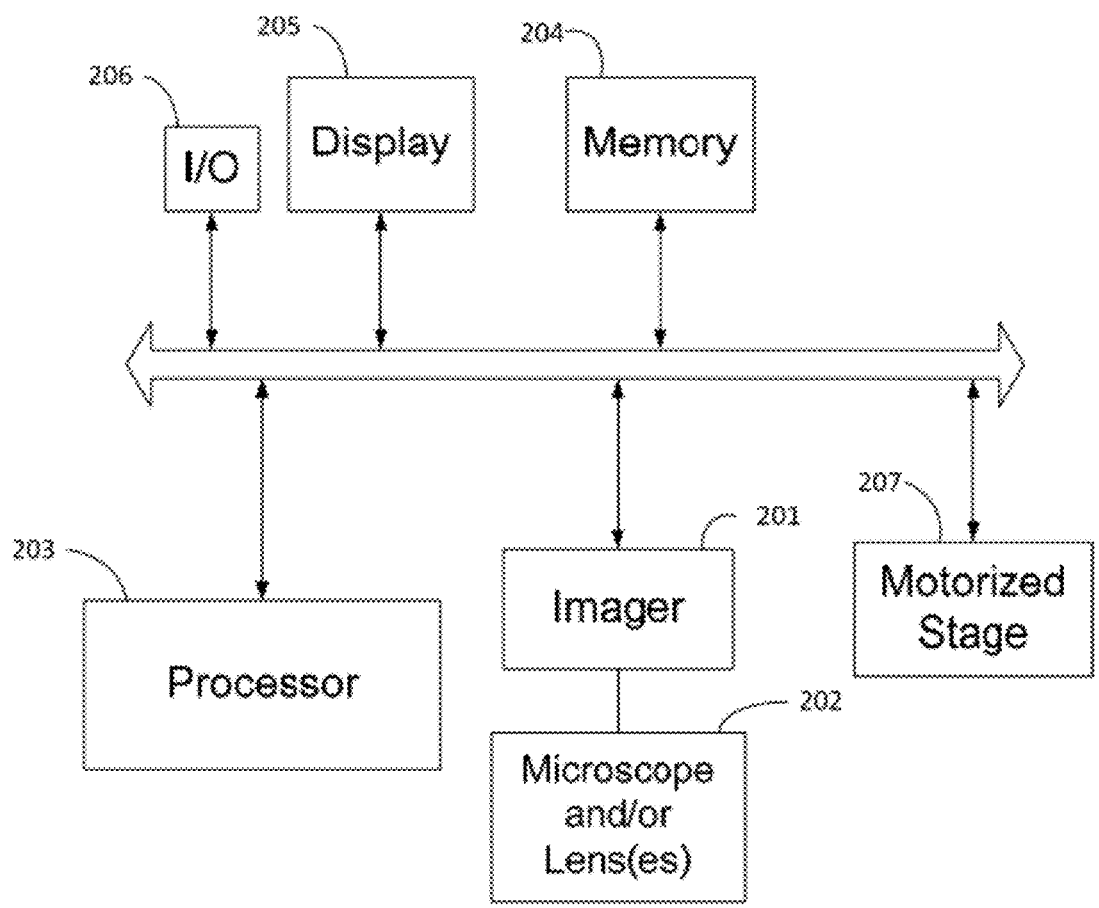
FIG. 2 shows a configuration of a computerized stereological system according to one embodiment of the invention.

FIG. 2 shows a configuration of a computerized stereological system according to one embodiment of the invention. An imager 201, which may be a digital image capture device such as described with respect to FIG. 1, can capture images of a biological sample viewed through a microscope and/or lenses 202. A processor 203 can control the system and perform instructions stored in the memory 204. The memory 204 may also be used for storing images captured by the imager.

Although a single processor 203 is shown as part of the system of FIG. 2, multiple processors may be included in the system to perform the various control functions. In addition, the memory 204 can include one or more types of memory structures.

A user can interact with the stereological system through an I/O device 206. A motorized stage 207 is included that can be movable in at least three directions, including x, y, and z directions. In a further embodiment, movement capabilities for rotational and angular directions can also be included. Movement of the motorized stage can be controlled by the processor 203. The stage may also be configured to allow for manual adjustments of the stage position. The imager 201 and the motorized stage 207 are used to capture a Z-stack of images of a sample on the motorized stage 207.

A Z-stack is a series of images captured at incremental steps in the Z plane or along the Z-axis. The incremental steps in the Z-plane can be, for example, about 0.1 μm, but can be selected in larger or smaller increments depending on the system capabilities.

In one embodiment, the Z-stacks can be captured after a user manually outlines (by selecting or clicking via a user interface) anatomically defined reference spaces in a low magnification (~2.5× objective) microscope image viewed through the user interface. After switching to high magnification, a series of X-Y locations can be automatically selected within the reference space in a systematic-random manner. A user may manually locate top and bottom optical planes at each X-Y location by clicking the location of interfaces between unfocused and focused images at the top and bottom of the tissue section and then set up the step increment and buffer in the Z-axis to ensure acquisition of unfocused images above and below the tissue section. The Z-stack of images is then acquired according to the step increment and buffer at the selected X-Y location. In addition, with further user assistance, multiple Z-stacks can be collected by repeating the steps at different systematic-random locations through the X-Y plane of the reference space.

Once the Z-stack is obtained using any suitable method, the top and bottom tissue surfaces of a Z-Stack of images can be located by using a specified focus function.

In accordance with various embodiments, the processor 203 can be configured to perform steps for identifying a top and a bottom boundary of each image of the Z-stack by performing a depth of focus analysis to determine just-out-of-focus focal planes of images within the Z-stack, the just-out-of-focus focal planes establishing boundaries with no interpolation between images within the Z-stack of images.

An autofocusing method is provided that defines the upper and lower surfaces of a section of stained tissue as the "just-out-of-focus" optical planes. Just-out-of-focus optical planes refer to the optical planes above and below first in-focus optical planes. In one embodiment, the top, bottom, and thickness of biological objects of interest (or slices of a biological object of interest) are determined by locating the in-focus optical planes at the upper and lower surfaces of stained biological objects of interest and then locating the start and end of each tissue section by locating the just out of focus optical planes through tissue sections along the Z-axis of the stained biological objects of interest.

In contrast to most other microscopy analysis methods (e.g., those using Brightfield, Clarkfield, confocal, differential interference contrast (DIC), and contrast, as well as time-lapse, live, and prepared tissue studies) in which the goal of the study is to find the optimal depth at which the biological microstructure occurs at maximal focus, stereological methods in microscopy in accordance with embodiments of the invention are directed to locating the boundary between the focused and unfocused depth of field for microstructures in the reference space. Accurate locations for these boundaries allows the system user to make sample estimates of both first-order (number, volume, length, surface area) and second-order (e.g., variation, spatial orientation) stereological parameters.

For example, certain embodiments of the invention can be implemented via a Stereologer™ (Stereology Resource Center, Inc., Chester, Md.), which is a commercially available computerized stereology system with integrated hardware and software. The Stereologer™ assists biomedical researchers in a number of tasks using high-resolution microscopy equipped with hardware (motorized x-y-z stage, camera) and software compatible with Macintosh or PC computer platforms. The Stereologer™ can automatically capture sets of Z-stacks of images with a step size as small as 0.01 micrometers at systematic randomly generated probe positions on the X-Y plane of a tissue section.

However, the system still requires considerable effort from trained users to make accurate, precise and precise estimates of first- and second-order stereological parameters. For example, at each X-Y location, users must locate and identify the boundary between in- and out of-focus optical planes at the upper and lower surfaces of a tissue section stained to reveal specific biological objects.

In particular, the current procedure used by the Stereologer™ involves outlining a region of interest (ROI) on about 8-12 tissue sections viewed under microscopic magnification. To select X-Y sampling locations in an unbiased manner, geometric probes are overlaid at random over the ROI and the software indicates the points internal and external to the ROI. At each grid point within the ROI, a stack of images is automatically acquired at fixed increments through the Z-axis. For manual operation, a trained user obtains the thickness of tissue sections by manually setting the top and bottom of the section (i.e., the depths where some feature in the image goes in and out of focus), while moving through the z-axis by stepping through the Z-axis of each tissue section. Next, the user manually selects by, for example, clicking, via a user interface, on biological objects of interest within the section thickness. The rate of data collection (throughput) of computerized stereology systems tends to be limited by the requirement for user interaction.

In accordance with certain embodiments of the invention, user interaction can be minimized by automatically determining the top and bottom of the section slice, followed by automatic detection of biological objects of interest.

Moreover, in contrast to the typical autofocus algorithms that are directed to finding the maximal point of focus as required for stereology studies, embodiments of the invention are directed to finding the just-out-of-focus focal plane. As opposed to a smooth change to an apex for finding the depth of maximum focus, the ideal focus-curve algorithm for the stereology applications of embodiments of the invention will have sharp changes (bends) from unfocused to focused and from focused to unfocused.

In accordance with various embodiments of the invention, autofocusing is performed to locate the just-out-of-focus planes in biological objects of interest. In one embodiment, the top, bottom and thickness of biological objects of interest are determined by locating the in-focus optical planes at the upper and lower surfaces of stained biological objects of interest and then locating the start and end through tissue sections along the Z-axis of stained biological objects of interest.

Figure 3:
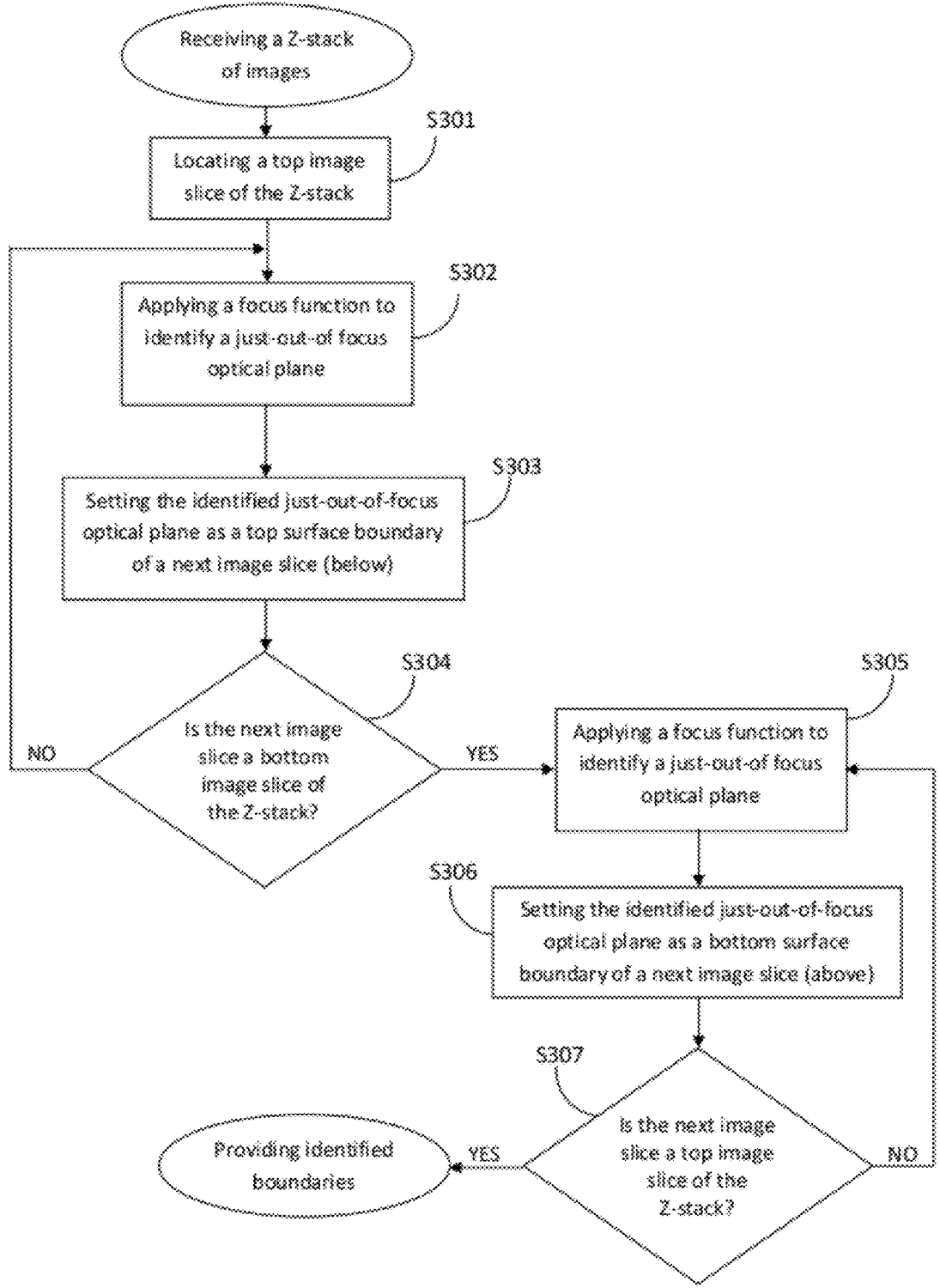
FIG. 3 illustrates a method of automatic surface location for section thickness determination in a stereology system in accordance with one embodiment of the invention.

Referring to FIG. 3, the system can receive a Z-stack of images obtained by any suitable method. From the Z-stack of images, a top image slice of the Z-stack is located (S301) and a focus function is applied to identify a just-out-of-focus optical plane (S302). The identified just-out-of-focus optical plane is set as a top surface boundary of the next image slice below the top image (S303). With decision step S304, as long as the next image slice is not the last slice in the stack (e.g., the bottom slice), the steps S302, S303, and S304 are performed in a loop so that the focus function is applied to identify the just-out-of-focus optical plane for each next image slice and the identified just-out-of-focus optical plane is set as the top surface boundary of the next image slice that follows. Once the bottom slice is located, the focus function is then applied from the bottom slice back to the top slice by performing a loop of steps S305, S306, and S306 in which the identified just-out-of-focus optical plane is set as the bottom surface boundary of the next consecutive image of the Z-stack until the next image slice is the top image slice of the Z-stack. The boundaries of the slices can be identified in this manner. The results of the identification can then be used to calculate thickness of each slice and facilitate probe placement in subsequent methods.

A pixel-to-pixel contrast or intensity threshold is used as a parameter for the focus function. The focus function threshold parameters can be optimized by using a training set of Z-stacks with manually determined tissue surfaces. A two-dimensional parameter space is also optimized for thresholded functions. Once the algorithm is trained and the optimized thresholds determined, the Z-stacks are analyzed as described with respect to FIG. 3 to find the top and bottom focal planes for automatic section thickness determination. The automated surface locating algorithm starts at the top of the Z-stack and moves down the Z-stack one image at a time. Focus of the first image is assessed over the trained focus threshold, and repeated for each consecutive image with each previous image designated as the just-out-of-focus optical plane (the top surface boundary). Then, the Z-stack is traversed from the bottom of the Z-stack to the top of the Z-stack, one image at a time, until the first image with focus measure over the trained focus threshold is located, with the previous image designated as the bottom tissue surface boundary. Except for the first image on either side of the in-focus region, no images within the in-focus region are analyzed.

In a first embodiment, the focus function applied to the captured images (e.g., the pixel-to-pixel contrast or intensity values of the captured images) is $$\sum_i \sum_j |\text{Threshold}(I(i, j+1) - I(i, j), T)|,$$

where $\text{Threshold}(x, T) = \begin{cases} x, & x \geq T \\ 0, & x < 0. \end{cases}$ The focus function used in the first embodiment can be referred to as an absolute gradient threshold focus function.

In a second embodiment, the focus function applied to the captured images is $$\sum_i \sum_j ModAbsThr(i, j, T), \text{ where}$$

$$ModAbsThr(i, j, T) =$$
$$\text{Threshold}(|I(i, j+1) - I(i, j)|, T) + \text{Threshold}(|I(i+1, j) - I(i, j)|, T),$$

$$\text{where Threshold}(x, T) = \begin{cases} x, & x \geq T \\ 0, & x < 0. \end{cases}$$

The focus function used in the second embodiment can be referred to as a modified absolute gradient (MAG) function. The ModAbsThr(i, j, T) function returns the thresholded absolute gradient contrast strength in both the horizontal and vertical direction for a given pixel location (i, j). The MAG function is a rotationally invariant form of the absolute gradient function.

In a third embodiment, the focus function applied to the captured images is $$\sum_i \sum_j Count(i, j, T),$$

where $Count(i, j, T) =$ $$\begin{cases} 1, & |I(i, j+1) - I(i, j)| \geq T \text{ OR } |I(i+1, j) - I(i, j)| \geq T \\ 0, & \text{otherwise.} \end{cases}$$

The focus function used in the third embodiment can be referred to as a modified absolute gradient count (MAGC) function. The Count(i, j, T) function is an indicator function that signifies whether the current pixel location (i, j) is high contrast, and returns 1 if this is true or 0 otherwise. High contrast for this function occurs when the absolute value of the difference between the current pixel and either its neighboring pixel to the right or directly below is greater than or equal to the designated threshold value. The MAGC function is rotationally invariant with a simple count of high contrast pixels, as determined by the Count(i, j, T) function.

In a fourth embodiment, the focus function applied to the captured images is $$\sum_i \sum_j \begin{cases} ModAbsThr(i, jT), & Count(i, j, T) = 1 \text{ AND} \\ & Median(i, j, T) \geq 4 \\ 0, & \text{otherwise,} \end{cases}$$

where $$ModAbsThr(i, j, T) = \text{Threshold}(|I(i, j+1) - I(i, j)|, T) +$$
$$\text{Threshold}(|I(i+1, j) - I(i, j)|, T),$$

$$\text{Threshold}(x, T) = \begin{cases} x, & x \geq T \\ 0, & x < 0, \end{cases}$$

$Count(i, j, T) =$ $$\begin{cases} 1, & |I(i, j+1) - I(i, j)| \geq T \text{ OR } |I(i+1, j) - I(i, j)| \geq T \\ 0, & \text{otherwise,} \end{cases}$$

and $Median(i, j, T) = Count(i-1, j-1, T) + Count(i-1, j,$

-continued
$T) + Count(i-1, j+1, T) + Count(i, j-1, T) +$
$Count(i, j+1, T) + Count(i+1, j-1, T) +$
$Count(i+1, j, T) + Count(i+1, j+1, T).$ The focus function of the fourth embodiment can be referred to as a filtered modified absolute gradient (filtered MAG) function. The Median(i, j, T) function describes a binary 3×3 median filter and determines the number of the eight immediate neighboring pixel locations with high contrast. In certain embodiments, the filtered MAG function can reduce spurious noise through the application of the 3×3 median filter to the MAG function.

In a fifth embodiment, the focus function applied to the captured images is $$\sum_i \sum_j \begin{cases} 1, & Count(i, j, T) = 1 \text{ AND } Median(i, j, T) \geq 4 \\ 0, & \text{otherwise,} \end{cases}$$

where $Count(i, j, T) =$ $$\begin{cases} 1, & |I(i, j+1) - I(i, j)| \geq T \text{ OR } |I(i+1, j) - I(i, j)| \geq T \\ 0, & \text{otherwise,} \end{cases}$$

and $Median(i, j, T) = Count(i-1, j-1, T) + Count(i-1, j, T) +$
$Count(i-1, j+1, T) + Count(i, j-1, T) +$
$Count(i, j+1, T) + Count(i+1, j-1, T) +$
$Count(i+1, j, T) + Count(i+1, j+1, T).$ The focus function of the fifth embodiment can be referred to as a filtered modified absolute gradient count (filtered MAGC) function. In certain embodiments, the filtered MAGC function can reduce spurious noise through the application of the 3×3 median filter to the MAGC function.

In the five embodiments of the focus function provided above, the performance of the system and method providing automatic surface location can be optimized by training the automated surface location system and method across a range of threshold parameters. For optimization, the focus function for the autofocusing method undergoes a thresholding of the focus function output (i.e., the focus measure or focus threshold). The focus functions of various embodiments of the invention utilize a pixel-to-pixel contrast threshold (and can be referred as a thresholded function). In one embodiment, the Nelder Mead simplex optimization method for two dimensional parameter spaces is used to find the optimal pixel-to-pixel contrast threshold. The threshold function can be expressed as $$\text{Threshold}(x, T) = \begin{cases} x, & x \geq T \\ 0, & x < 0. \end{cases}$$

The threshold function can then be paired with the total image focus threshold to yield a focus function with the lowest average error rate. Of course, embodiments are not limited to the use of the Nelder Mead simplex optimization method.

Once the slices are identified, in a further embodiment providing automatic quantifying of biological objects of interest within a sample, an image slice undergoes color processing to establish a threshold and then the image slice undergoes gray level processing using the established threshold to count first and second order parameters in the image slice.

Biological microstructures or biological objects of interest typically include, but are not limited to cells, fibers and blood vessels. First order parameters can include number, length, surface area and volume while second order parameters can include variation and spatial determination.

Figure 4A:
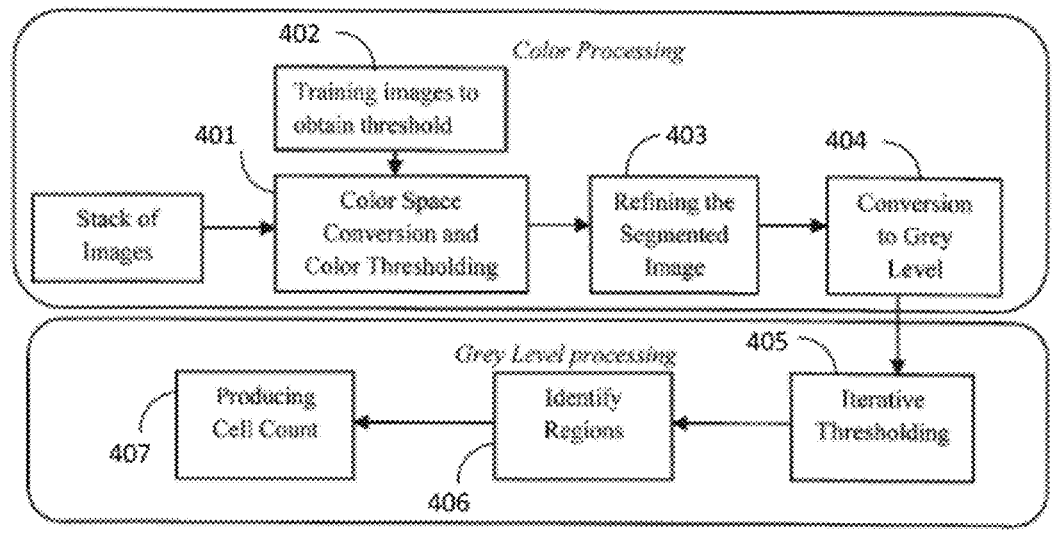
FIG. 4A shows a block diagram of color processing and gray level processing in accordance with an embodiment of the invention.

According to one embodiment, the system can automatically detect biological objects of interest through a combination of color processing and gray level processing. FIG. 4A illustrates one such method in accordance with an embodiment of the invention. The color processing aspects of the method are performed to identify biological objects of interest within a region of interest. Since different stains can be used to highlight different biological microstructures, color processing is effective for targeting a specific biological object of interest.

Figure 5:
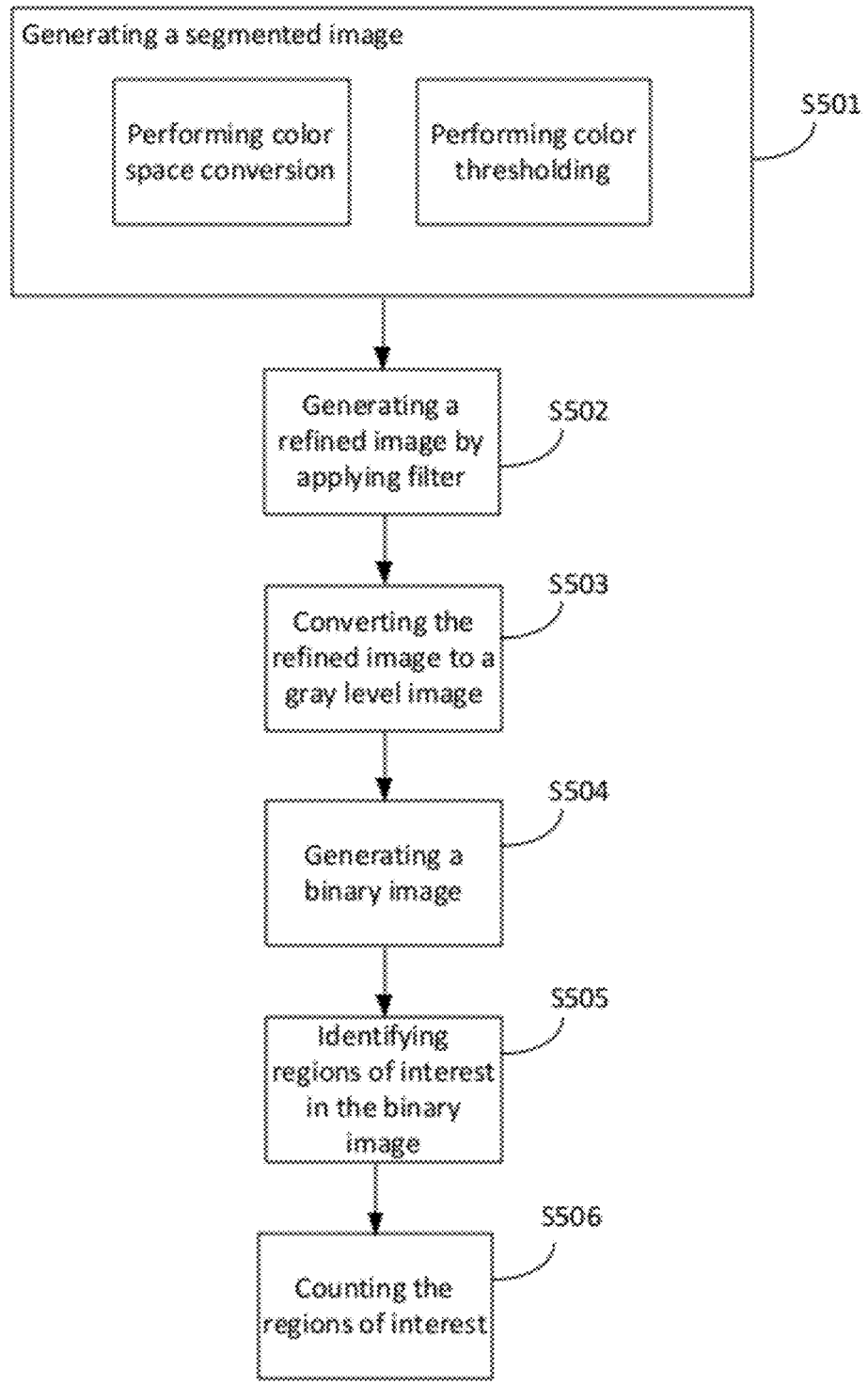
FIG. 5 illustrates a method of automatic object detection in a stereology system in accordance with an embodiment of the invention.

Referring to FIG. 4A, the color processing can include segmenting images into foreground and background (see S501 of FIG. 5). The foreground can contain biological objects of interest with a specified color while the background can contain all other elements of the image. The segmenting of the images can include a color space conversion and color thresholding 401 (see also S501 of FIG. 5). The color space conversion can be accomplished by converting from RGB (red, green, blue) to HSI (hue, saturation, intensity), where, for color values of B≤G, $$H = \arccos\left(\frac{\frac{1}{2}[(R-G)+(R-B)]}{\sqrt{(R-G)^2+(R-B)(G-B)}}\right)$$

$$S = 1 - \frac{3}{R+G+B} \times \min(R, G, B)$$

$$I = \frac{R+G+B}{3}$$

If $B > G$, then $H = 2\pi - H$

Figure 4B:
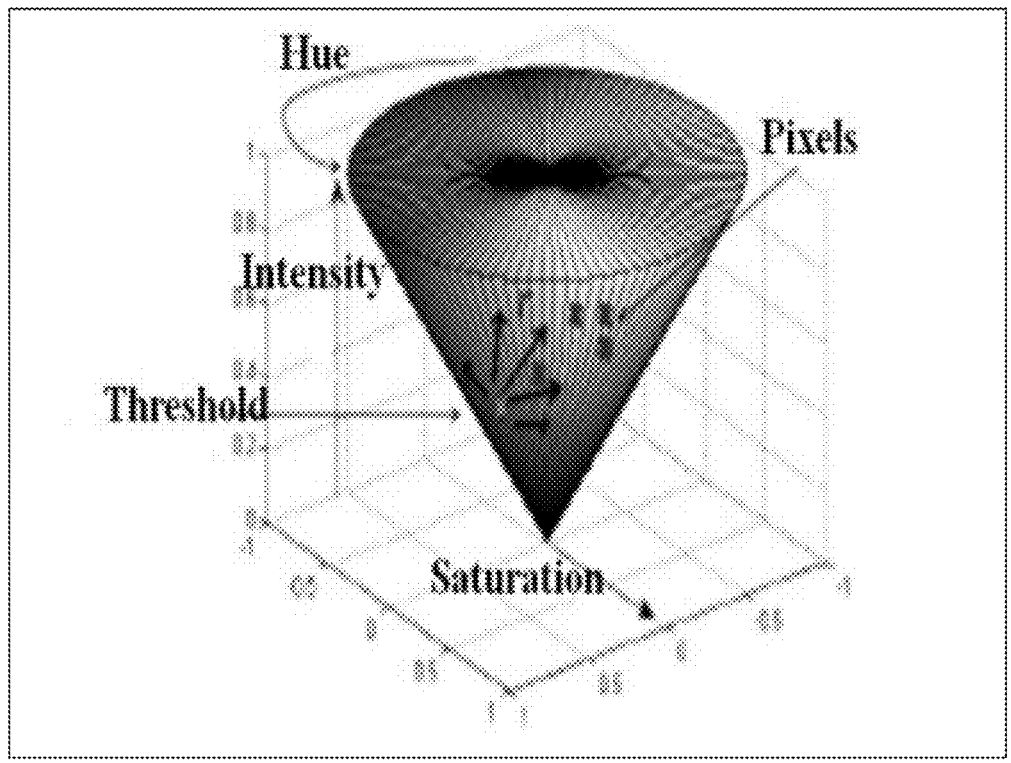
FIG. 4B shows a plot of the hue-saturation-intensity (HSI) color space in accordance with an embodiment of the invention.

The hue and saturation in cylindrical HSI coordinates correspond to the angular and radial polar coordinates, respectively, as shown in FIG. 4B.

Figure 6A:
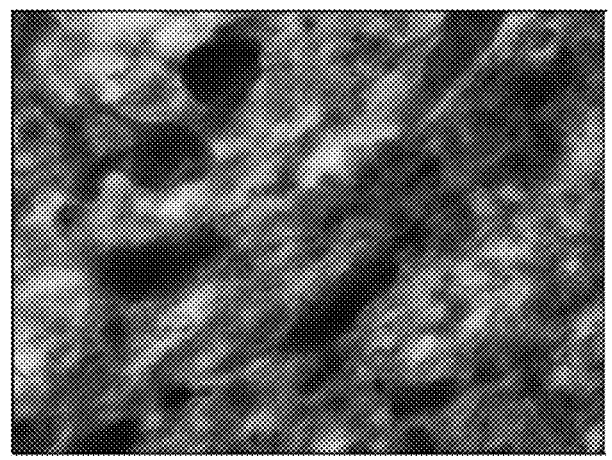
FIGS. 6A-6E show images after performing particular steps of a color processing portion of a method of automatic detection of objects (cells) in accordance with an embodiment of the invention.
Figure 6B:
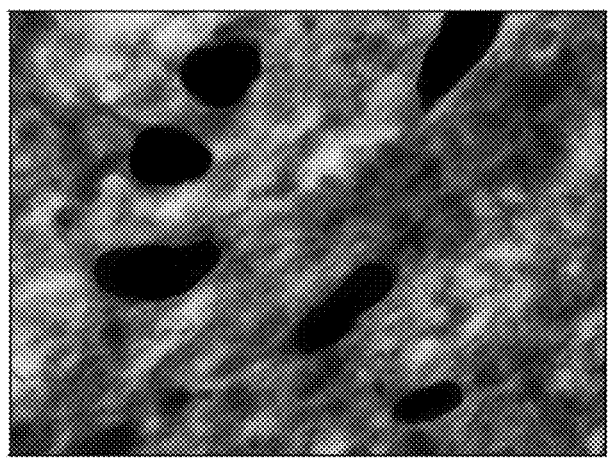

A threshold can be obtained (402) to determine if a color pixel within the image has the color range of the biological objects of interest by performing a training step. In one embodiment, the training process involves manually outlining the cells of interest in each image in the stack. An example of an outline is shown in FIG. 6B.

The locations of the biological objects of interest are obtained along with the average amount of red, green and blue content of the biological objects of interest and the standard deviation for each channel. The average color of red, green and blue content from the outlined biological objects of interest is converted to HSI space.

Each pixel in the image is checked to determine if its color is within a distance from the average color. The initial point is the average color with hue and saturation corresponding to a point in the polar coordinate system. A new color (d) represents a distance as a function of the initial point, the standard deviation (Φ), and a constant K where, d(red,green,or blue)=Threshold(red,green,or blue)+ K*b(red,green,or blue).

The new color d is then converted into HSI space and the corresponding Cartesian coordinates are obtained by x=S·cos(Hπ) and y=S·sin(Hπ).

The threshold, or required distance, can be obtained by calculating the Euclidian distance between the initial point and the new color point. The color thresholding process determines if each pixel in the image is within the threshold by comparing each pixel to the average color using the threshold distance. The pixels determined to be within the threshold are contained in the resulting image and each pixel retains its original color.

The segmented image is further refined (403) to obtain an image with primarily the biological objects of interest. According to one embodiment, a fill-hole algorithm is used to retain the shape of the cells as solid cells without holes. Extra regions can be removed by an opening operation, erosion, followed by dilation. A connected component analysis is then done to identify and count connected regions in the image. While counting the regions, the size of the regions can be obtained and any extra regions not eliminated by morphological operations can be removed.

After the color processing identifies biological objects of interest, the image is converted to gray level 404, and gray level processing is performed on the image to count the number of cells present in each image of the stack. Gray level images contain intensity information where black represents no intensity with a value of zero and white represents maximum intensity with a value of 255. Iterative thresholding 405 is performed and a binary image is obtained. A region growing operation is performed on the segmented (404) and gray level converted (405) image. Region growing starts with scanning the images for a first black pixel, where upon encountering the first black pixel, a region is grown (or built) by using an eight-pixel connectivity approach for the binary image. A unique identity number can be sequentially assigned to each grown region. Each identified region (406) carries additional attributes including, but not limited to the number of pixels, mean intensity, median intensity, height and width of the identified region. Four cell components, top, left, bottom and right, are determined to track the location of the cell. Regions are visually identified (406) by bounding boxes drawn around the biological objects of interest. Then, a cell count can be produced 407 from the identified regions.

FIG. 5 illustrates one embodiment of a method of identifying an object of interest. As shown in FIG. 5, an object of interest can be identified and counted by performing color space conversion and color thresholding to generate a segmented image (S501); refining the segmented image by applying a filter to generate a refined image (S502); converting the refined image to a gray level image (S503); performing iterative thresholding of the gray level image to generate a binary image (S504); identifying regions in the binary image to draw a boundary box for each cell representing a biological feature of interest (S505); and counting regions of interest to produce a cell count (S506).

A stack of images collected inside a region of interest (ROI) may contain several types of cells. In order to count a specific cell located in the ROI, different stains are used for different cells, enabling color information as a differentiator that can be used to target a particular type of cell. FIG. 6A shows an original colored image from a stack of images.

In accordance with certain embodiments of the invention, color thresholding is performed to segment the image into a foreground containing the cells that have the color of the cells of interest and background containing everything else (S501). The threshold required to determine if the cells in the image have the color range of the particular cells of interest can be obtained by training. In one embodiment, the training process involved manually outlining the cells of interest in each image in the stack. FIG. 6B shows an image of cells of interest painted in black for training. In process of color thresholding, each pixel in the image is checked to determine if its color is within a distance from the average color. The average color with hue and saturation corresponds to a point in the polar coordinate system and is called an initial point. The distance is calculated by finding new color (point) using the initial point and the standard deviation obtained from training.

Once the location of the cell and the average amount of red, green, and blue content of the cell and the standard deviation for each channel are obtained from the original colored image shown in FIG. 6A (after the training using the training image shown in FIG. 6B), the average amount of the red, green, and blue content of the cell undergoes color space conversion from RGB to HSI. The conversion formulas can be as described with respect to FIGS. 4A and 4B. In particular, RGB can be converted to HSI using the following formulas:

$$H = \arccos\left(\frac{\frac{1}{2}[(R-G)+(R-B)]}{\sqrt{(R-G)^2+(R-B)(G-B)}}\right)$$

$$S = 1 - \frac{3}{R+G+B} \times \min(R, G, B)$$

$$I = \frac{R+G+B}{3}$$

If $B > G$, then $H = 2\pi - H$.

Figure 6C:
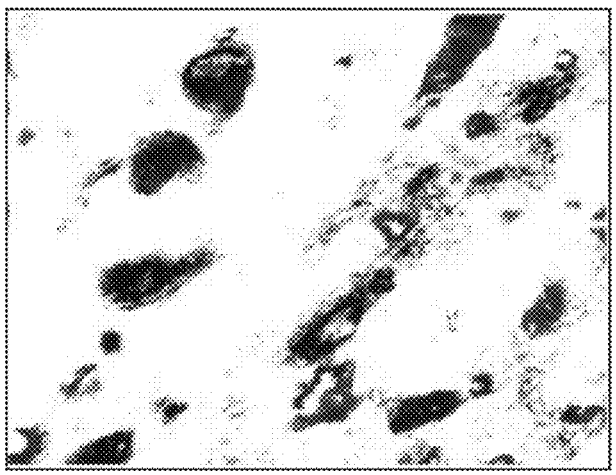

For the examples shown in FIGS. 6A-6E, the threshold value is obtained using d(red, green, or blue)=Threshold(red, green, or blue)+K*Φ(red, green, or blue), where the value for the constant K was chosen to be 1.6. Once the new color is converted into HSI space, the corresponding Cartesian coordinates were obtained using x=S*cos(Hπ) and y=S*sin(Hπ); and the Euclidian distance between the initial point and a new color (point) provides the required distance (threshold). The process of color thresholding checks if each pixel in the image is within the threshold or not. The output is not a binary image, but an image with the cells identified with their original color as shown in FIG. 6C.

Figure 6D:
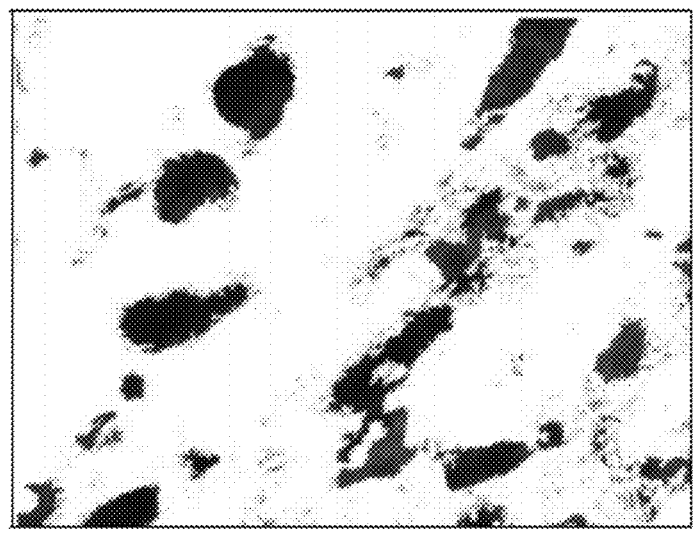
Figure 6E:
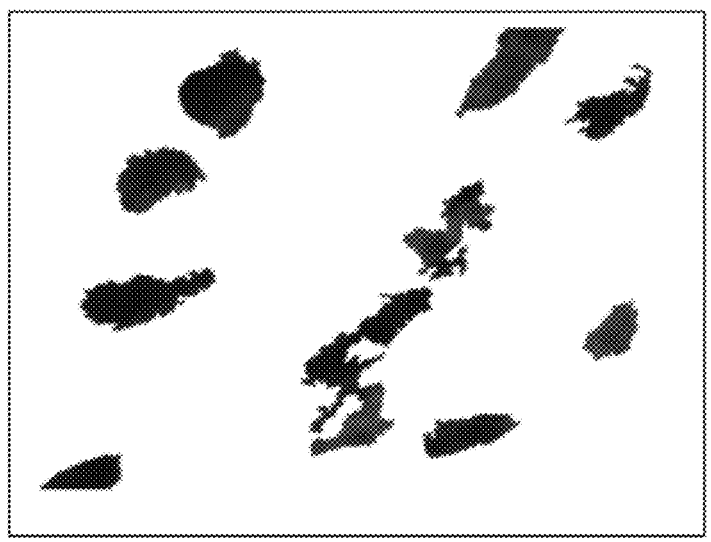

As shown in FIG. 6C, the color thresholded image contains areas with holes. In addition, the image has some extra regions that may not be the cells of interest. To obtain an image with just the particular cells of interest, additional processing is undergone. To retain the shape of the cells (e.g., solid cells without holes), a filter can be applied to generate a refined image (S502). In the example embodiment, two filters are used to refine the image. A fill-hole algorithm can be used, where an opening operation (erosion followed by dilation) is used to remove extra regions. The result of applying this first filter is shown in FIG. 6D. As can be seen in FIG. 6D, the image still includes unwanted regions. A connected component analysis can be performed to identify and count connected regions. While counting the number of regions, the size of the regions can also be obtained. Using this size information, any extra regions the morphological operations did not eliminate can be removed. The result of applying this second filter is shown in FIG. 6E.

Once the image is refined, the refined color thresholded image is converted to gray level (S503) to initiate the automatic counting of the number of cells present in each image of the stack.

Gray level images contain intensity information, black represent no intensity with a value of zero and white represents maximum intensity with a value 255.

Figure 7A:
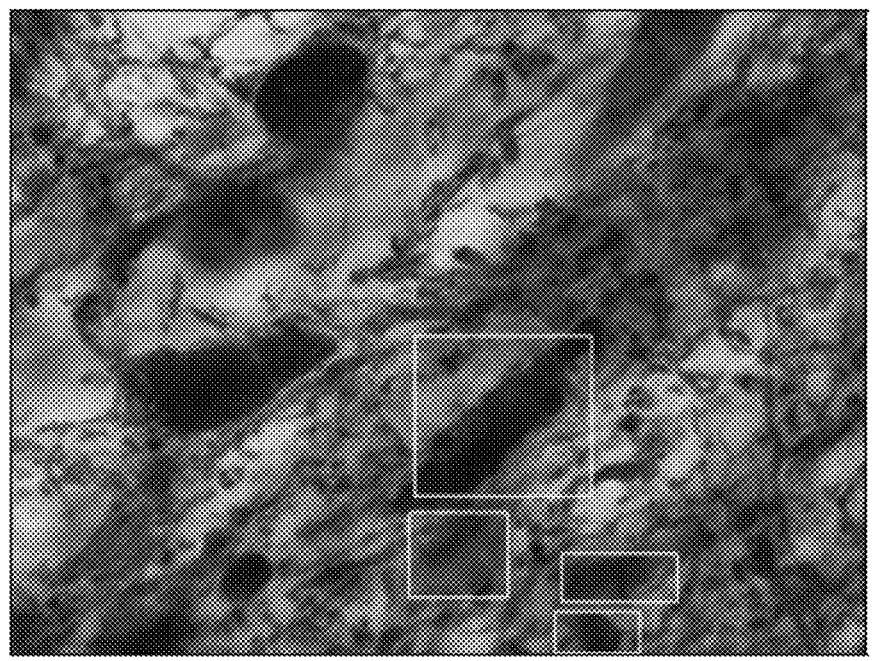
FIGS. 7A-7D show images after performing particular steps of a gray-level processing portion of a method of automatic detection of objects (cells) in accordance with an embodiment of the invention.
Figure 7B:
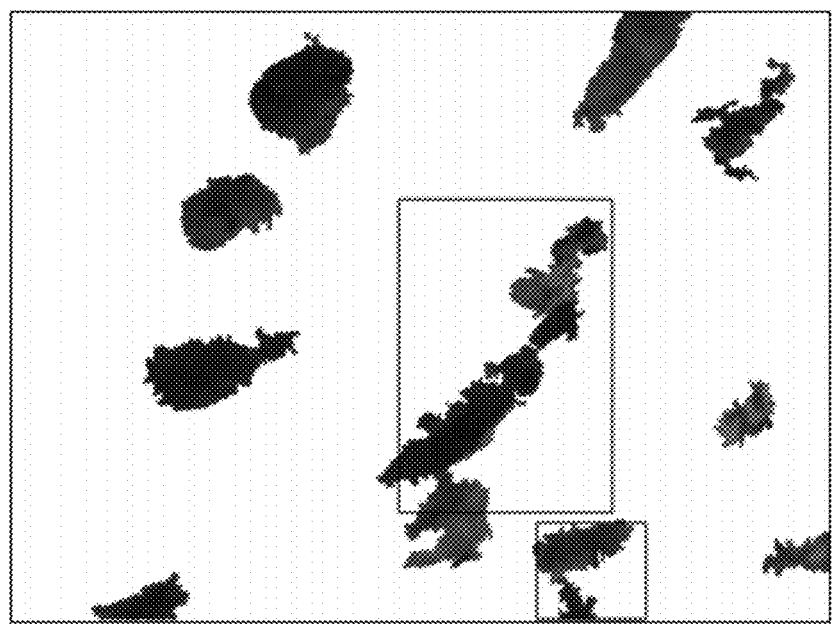
Figure 7C:
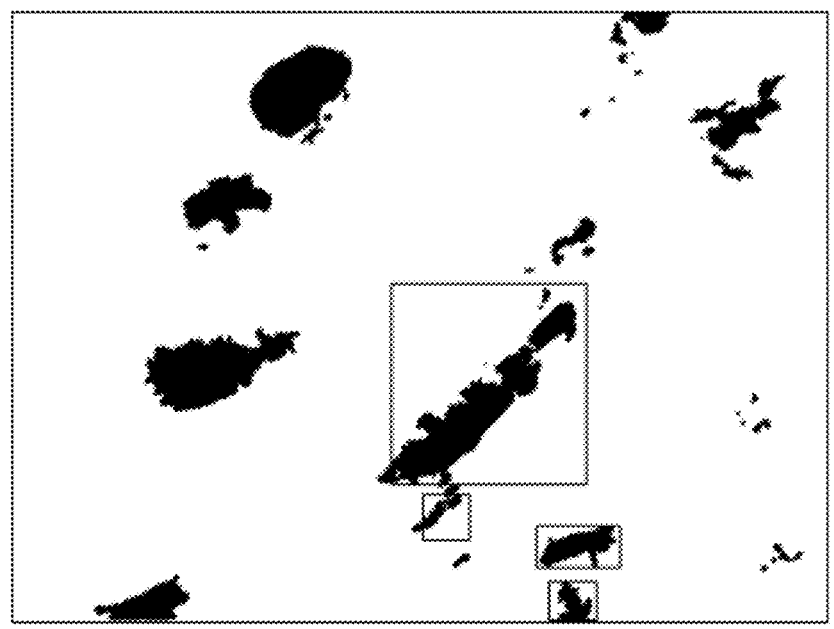

FIG. 7A shows an original color image before color processing with what appears to be four cells in the image (indicated with boxes). FIG. 7B shows the image after the color thresholding described with respect to FIGS. 6B-6E. As shown in FIG. 7B, the four cells outlined in FIG. 7A appear as two cells. Two cells are identified as a single entity because the average amount of color is the same in both the cells. The gray-level processing begins by segmenting the image. This can be accomplished by performing iterative thresholding, which outputs a binary image (S504). A global threshold is not used here because the lighting conditions differ within the image and several thresholds would be required for each stack of images. Segmentation helps in obtaining just the cell without its surroundings and separates cells that are close to each other as shown in FIG. 7C.

After performing the iterative thresholding (S504), a region growing operation is performed on the segmented image (S505). Region growing starts with the first black pixel it encounters in the binary image and builds a region using "eight connectivity." As each region is grown, a unique identity number is sequentially assigned, enumerating the regions. In addition, each identified region carries additional attributes such as number of pixels, mean intensity, median intensity, height and width of the identified region. To track the location of the cell, four components are determined top, left, bottom, and right.

Figure 7D:
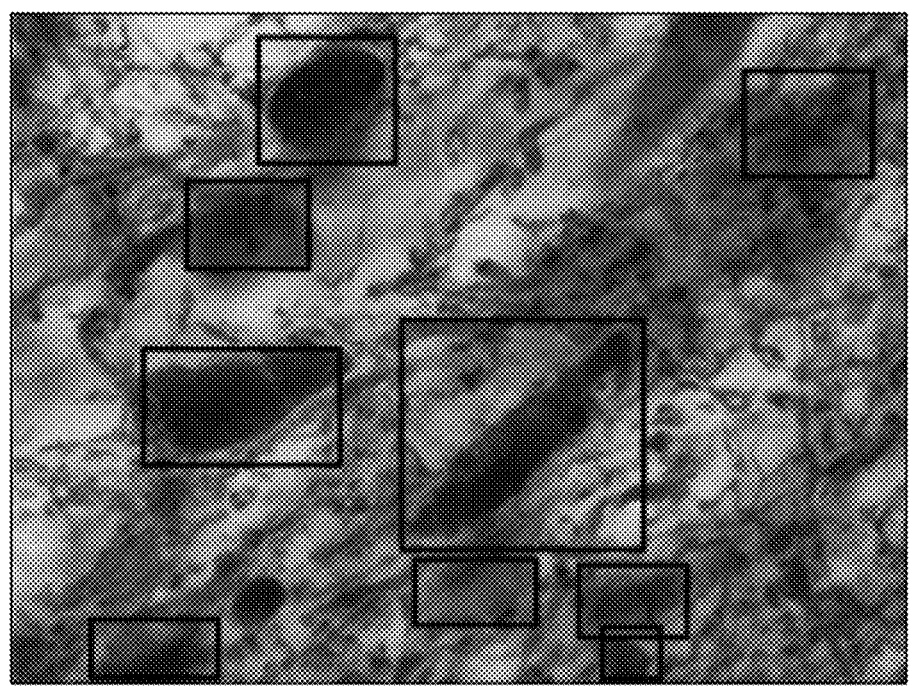
Figure 8A:
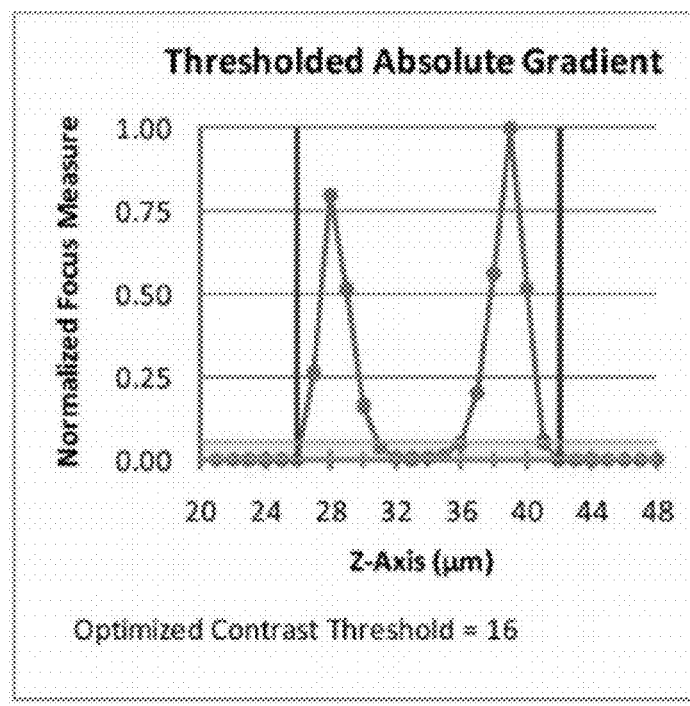
FIGS. 8A-8R show focus curves from a Z-stack of the Cryostat Traning Set (Rat C1 Sec09 XY02) of the example studies comparing 18 focus functions including focus functions of various embodiments of the invention.
Figure 8B:
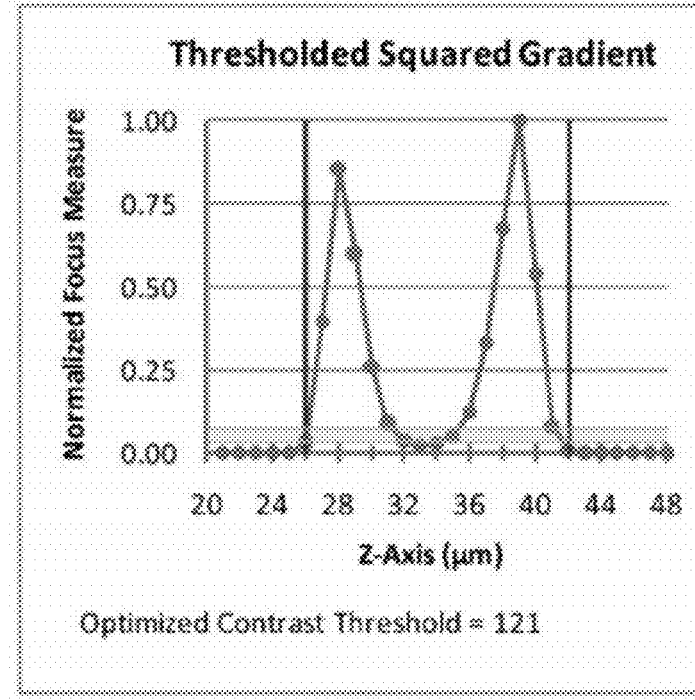
Figure 8C:
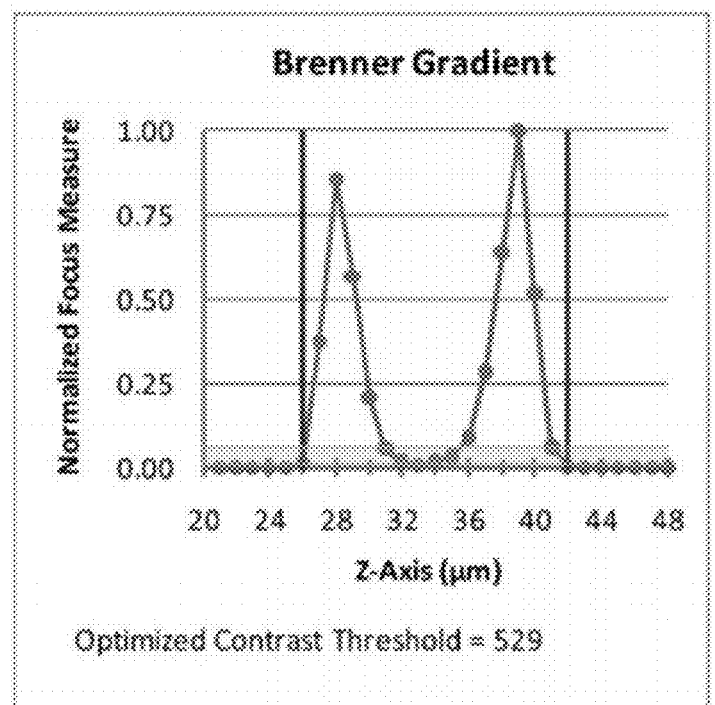
Figure 8D:
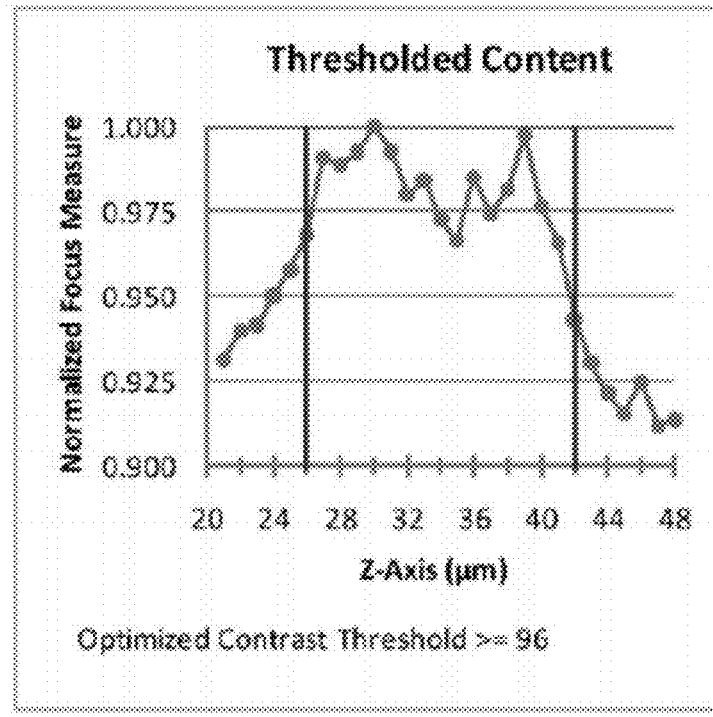
Figure 8E:
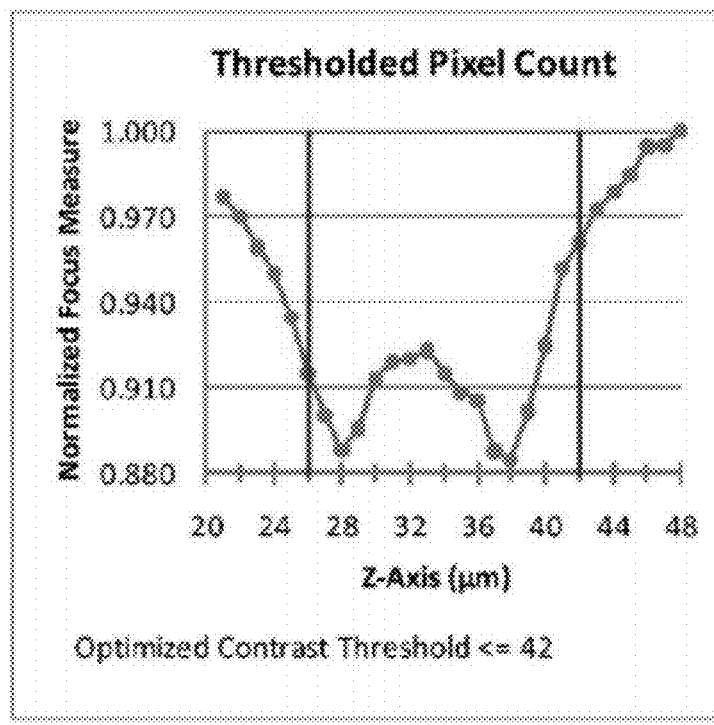
Figure 8F:
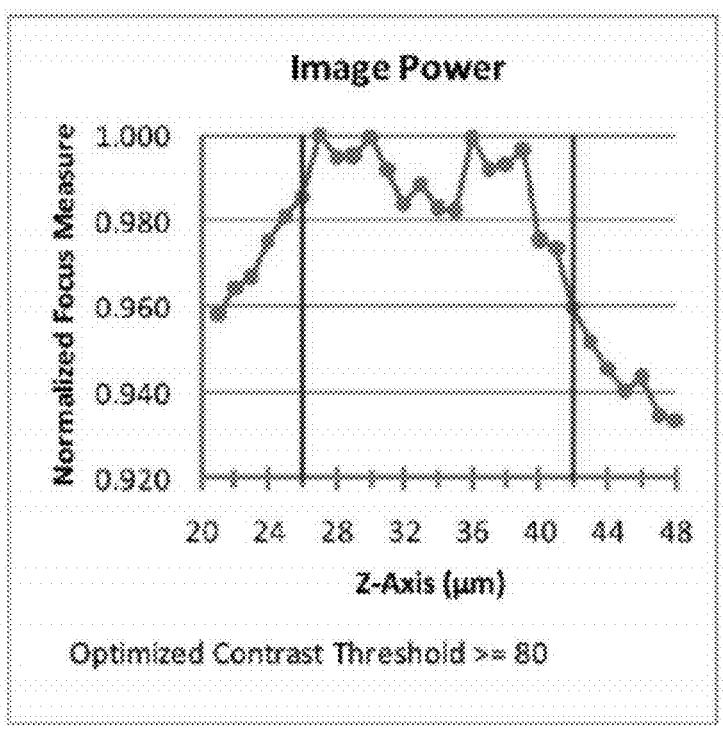
Figure 8G:
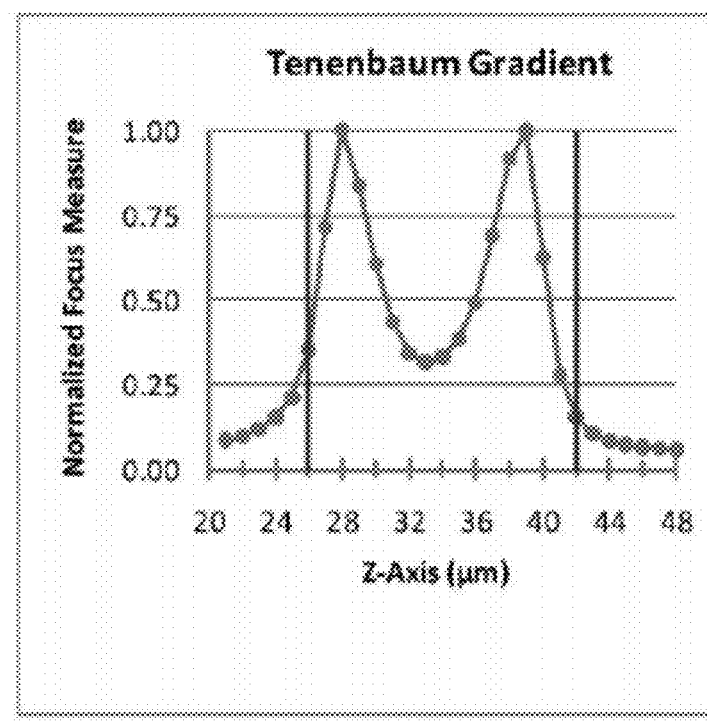
Figure 8H:
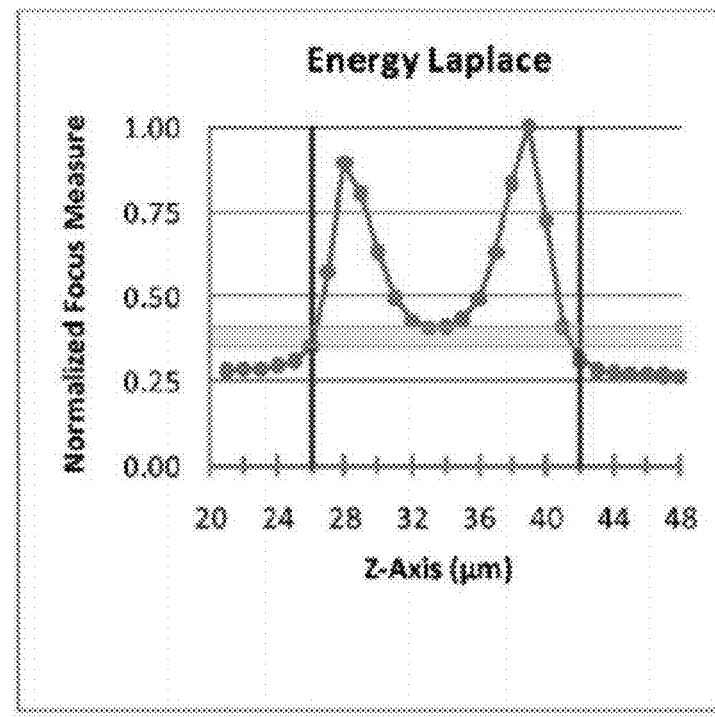
Figure 8I:
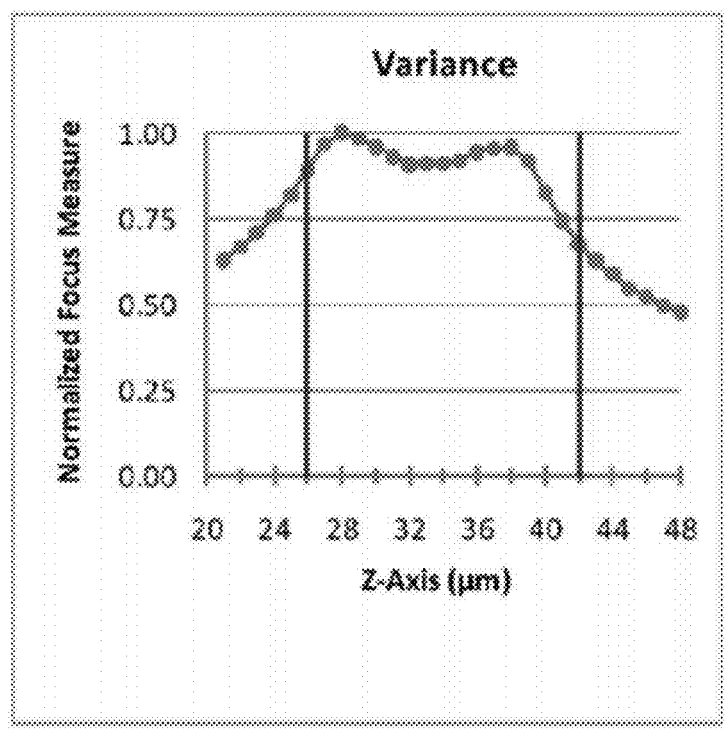
Figure 8J:
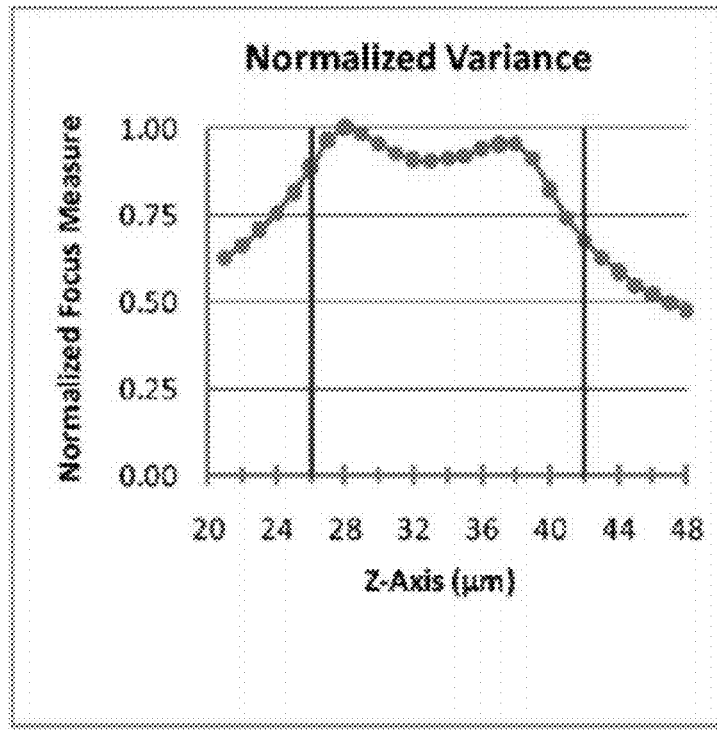
Figure 8K:
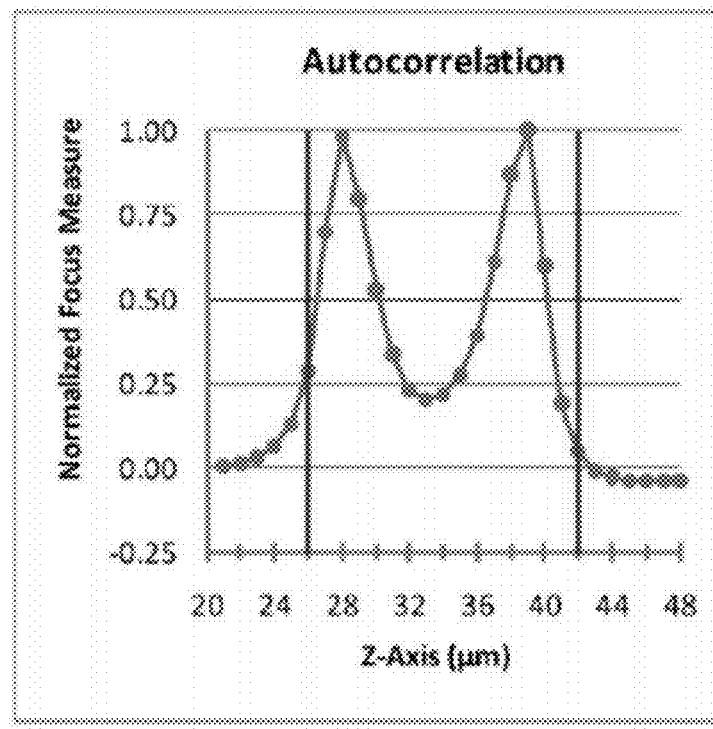
Figure 8L:
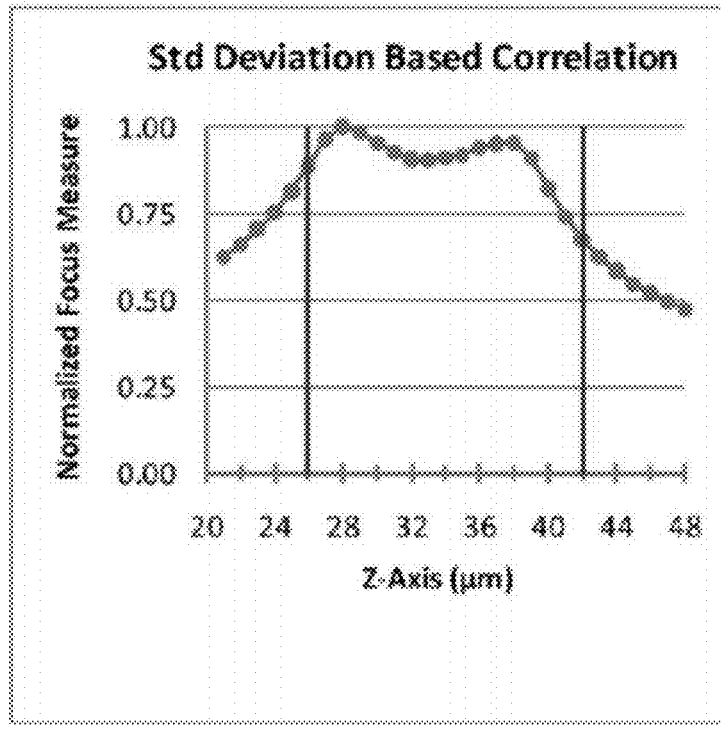
Figure 8M:
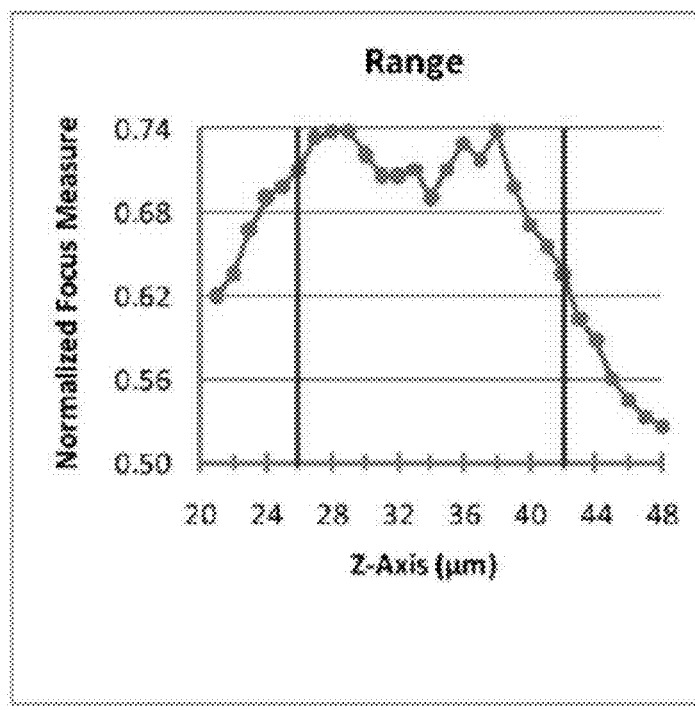
Figure 8N:
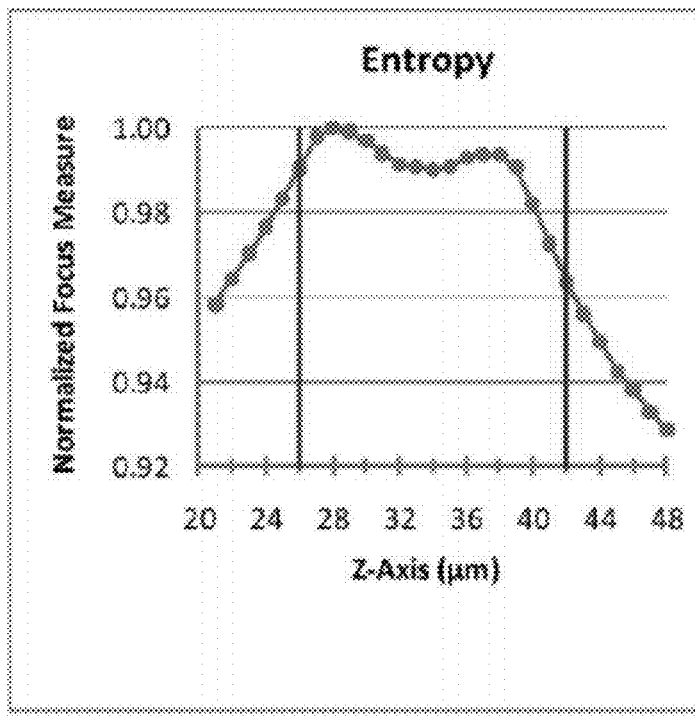
Figure 8O:
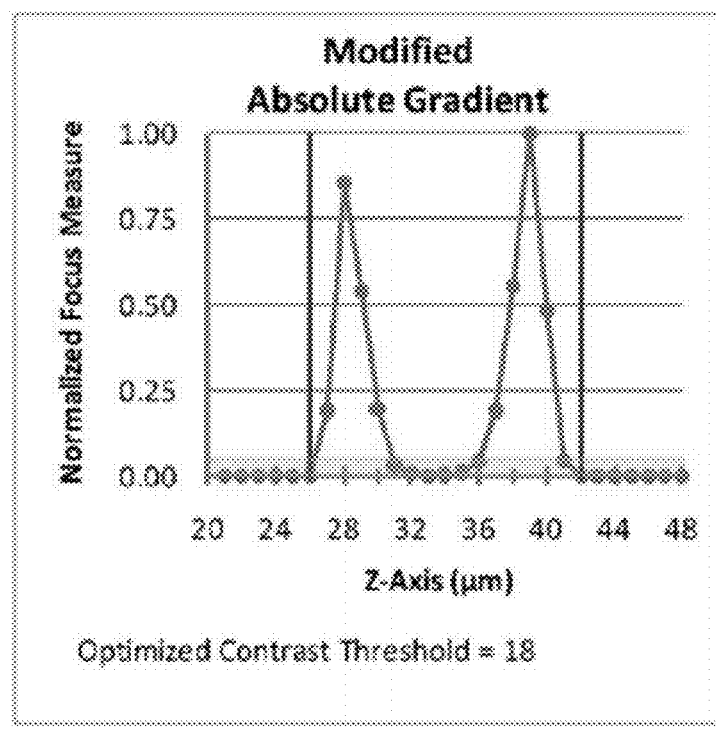
Figure 8P:
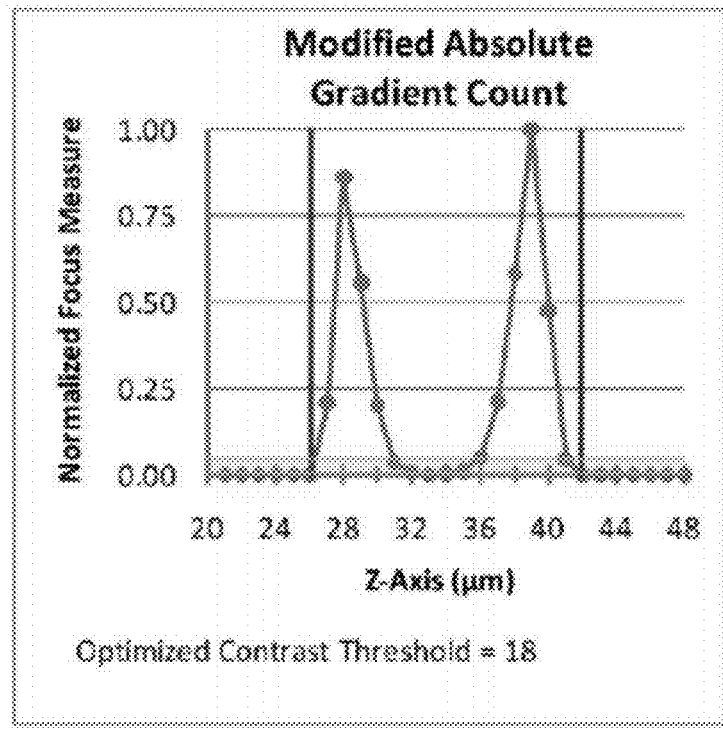
Figure 8Q:
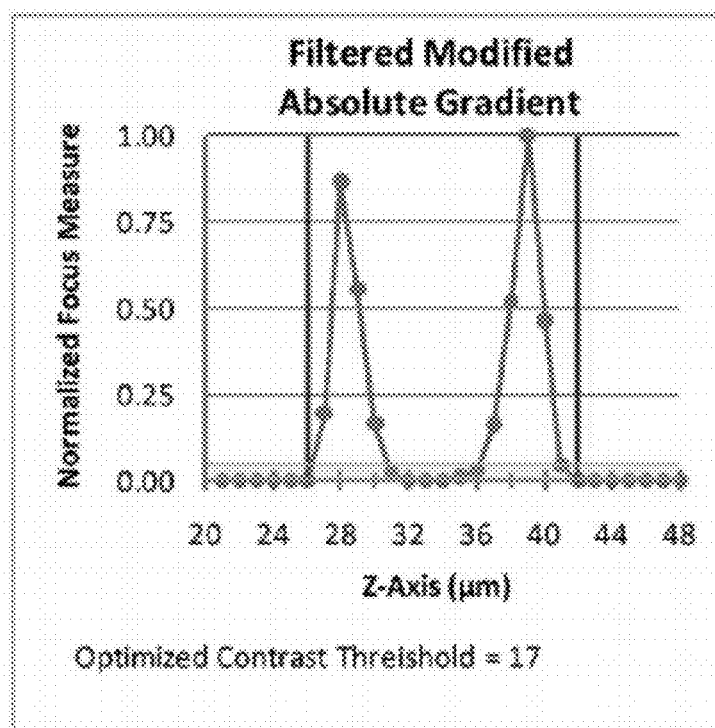
Figure 8R:
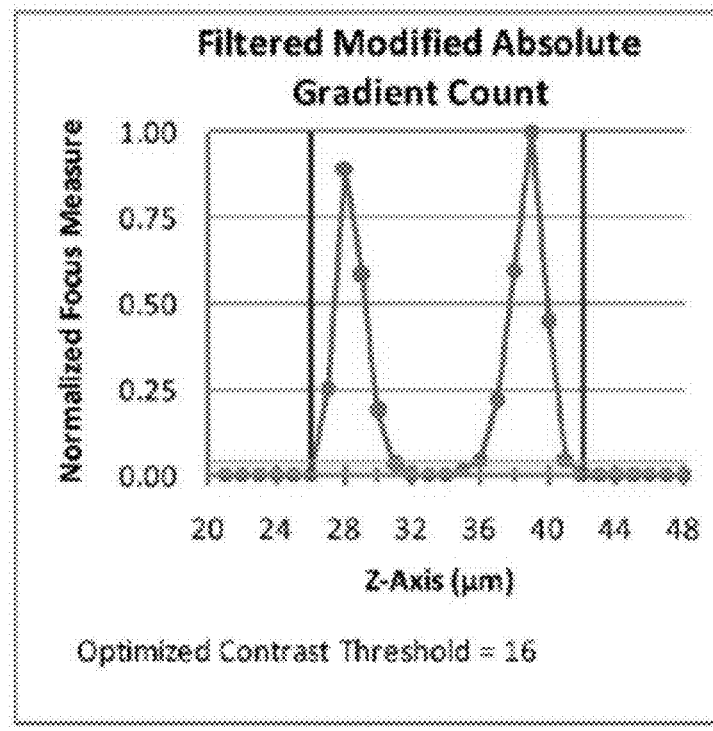

A bounding box can be drawn for each cell for visual representation using the uniquely identified regions. FIG. 7D shows the output of region growing where a bounding box is drawn for each identified region. After identifying the regions and drawing a boundary box, a cell count can be produced (S506). In one embodiment, the final output can include a set of images and a text file with each cell and the information associated with it. A sample text file with cell count is shown in Table 1. Table 1 indicates that there are two images in the stack (as indicated by the two IMAGE NAMES, and each image has four cells (as indicated by four REGION IDs). Each cell's location is given by TOP and LEFT coordinates, and the number of pixels present in the cell is provided as NUM OF PIXELS. Although only two images are listed in the Table 1, in practice, there are typically 15-20 images in each stack.

TABLE 1

Sample Output Text File

| REGION ID | TOP | LEFT | NUM OF PIXELS |
|---|---|---|---|
| IMAGE NAME: Z39 | | | |
| 1 | 0 | 14 | 322 |
| 2 | 34 | 118 | 1917 |
| 3 | 147 | 672 | 9828 |
| 4 | 341 | 591 | 5425 |
| IMAGE NAME: Z40 | | | |
| 1 | 0 | 14 | 262 |
| 2 | 35 | 119 | 1750 |
| 3 | 65 | 58 | 186 |
| 4 | 149 | 675 | 9219 |

The automatic slice (top, bottom, thickness) identification and quantifying of biological objects of interest can both be performed by the automated stereological system controller described with respect to FIG. 1. The automatic stereological system controller can include a computer system, which can have hardware including one or more computer processing units (CPUs), memory, mass storage (e.g., hard drive), and I/O devices (e.g., user input devices).

Certain techniques set forth herein may be described in the general context of computer-executable instructions, such as program modules, executed by one or more computers or other devices. Certain embodiments of the invention contemplate the use of a computer system within which a set of instructions, when executed, can cause the system to perform any one or more of the methodologies discussed above. Generally, program modules include routines, programs, objects, components, and data structures that perform particular tasks or implement particular abstract data types.

It should be appreciated by those skilled in the art that computer readable media include removable and non-removable structures/devices that can be used for storage of information, such as computer readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media capable of storing computer-readable media now known or later developed. Computer readable media should not be construed or interpreted to include any propagating signals.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

Example 1

Focus Function Comparison

Example studies of a variety of focus functions were carried out using a Stereologer™ system having a Zeiss Axioskop 20 Brightfield microscope with a range of low (Zeiss Plan Neofluar 2.5×) to high (Zeiss Plan-Apochromat 100× oil immersion, numerical aperture 1.4) magnification objectives equipped with digital imaging and interfaced to a motorized X-Y-Z stage (ASI, Eugene, Oreg.) for both manual and automated modes via the system software. The digital camera (Microfire, Optronics, Goleta, Calif.) was capable of capturing 800×600 pixel images in 8-bit by three channel (RGB) color mode. The charged-coupled device (CCD) for the camera was a single ⅔"1600×1200 pixels array with 7.4 μm×7.4 μm pixel size using a Bayer mosaic filter array to capture color information. This common Bayer filter placed a mosaic filter over the CCD such that each 2×2 pixel square had an RGB (25 Red, 50 Green, 25 Blue) color filter. The Stereologer™ software was compatible with both iMac® G4 platform (32-bit 1.25 GHz, OS10.6) and Dell® Optiplex® GX280 (32 bit 3.20 GHz Intel Pentium4) running Microsoft® Windows® 7 Enterprise version.

In the experimental examples, the level of accuracy for automatic determinations was within 1.0 μm on average from the surface location determined by manual measurement. With typical step size of 1.0 μm between optical planes in the Z-axis, this level of accuracy translates to ±1 optical plane from the ground-truth plane.

The Depth of field (DOF) was calculated to be 0.43 μm using $$DOF = \frac{\lambda \eta}{(NA)^2} + \frac{e\eta}{M(NA)},$$

where X, is the wavelength of illuminating light (0.55 μm for average visible light); η is the refractive index (1.516 for immersion oil); NA is the objective numerical aperture; M is the lateral magnification; and e is the lateral resolution power (constrained to a minimum of 0.24 μm by Abbe diffraction limit). The second term $$\left(\frac{e\eta}{M(NA)}\right)$$

becomes insignificant at high magnification and high numerical aperture (100× oil immersion, NA 1.4). A proper choice of objective is used to achieve the practical light microscope minimum DOF. A shallow DOF results in a shallow depth of focus that is desirable as reducing depth of focus is equivalent to enhancing axial. For example, a DOF of less than 1.0 μm achieves 1.0 μm precision.

Tissue for the example studies provided by the Stereology Resource Center (SRC, Chester, Md.)] included sections stained with two common approaches to reveal microstructures of biological interest: tyrosine hydroxylase (TH) immunocytochemistry to reveal dopaminergic neurons in rat substantia nigra; and, Nissl histochemistry (cresyl violet) to stain pyramidal neurons in the CA (Cornu Ammonis) region of the hippocampus. A Z-stack of each tissue sample was defined as a series of images captured at incremental (0.1 μm) steps in the Z plane. Table 2 provides three separate datasets consisting of Z-stacks of images that were acquired at high magnification (100×, 1.4 NA) with the X-Y plane and Z-axis perpendicular and parallel, respectively, to the camera axis.

TABLE 2

Characteristics of Datasets Used for Evaluation

| Dataset | Description | Number of Z-stacks | Number of Images |
|---|---|---|---|
| Training Set | Cryostat 010610 Substantia Nigra Rat C1 Sec: 05, 07, 08, 09 | 18 | 455 |
| Test Set #1 | Cryostat 010610 Substantia Nigra Rat C1 Sec: 05, 07, 08, 09 | 16 | 373 |
| Test Set #2 | Nissl 041696 Hippocampus Rat10 | 18 | 490 |

The Stereologer™ captured the Z-stacks using the following procedure:

1) Manual user clicks of anatomically defined reference spaces (the substantia nigra and the hippocampus) outlined at low magnification (2.5× objective).

2) After switching to high magnification, an automatic selection of a series of X-Y locations within the reference space in a systematic-random manner.

3) User location of top and bottom optical planes at each X-Y location by clicking location of interfaces between unfocused and focused images at top and bottom of tissue section.

4) User set-up of step increment and buffer in Z-axis to ensure acquisition of unfocused images above and below tissue.

5) An automatic acquisition of a Z-stack at a particular X-Y location.

6) With user assistance, the Stereologer™ system collects multiple Z stacks by repeating steps 3, 4 and 5 at different systematic-random locations through the X-Y plane of the reference space.

As indicated in Table 2, the acquired Z-stacks were divided into three datasets—a training set and two test sets. The training set and test set #1 included Z-stacks from sections through a single brain region (substantia nigra), stained with TH immunocytochemistry from the brain of a single rat. A second test set (test set #2) included Z-stacks acquired from sections though the brain of a different rat, from a different brain region (hippocampus), and stained with a different procedure (Nissl histochemistry).

The Z-stacks described with respect to Table 2 were used in evaluating the focus functions of the example studies. Eighteen focus functions were applied to the test studies and compared to illustrate the capabilities of the focus functions used in certain embodiments of the invention. The following functions were used in the study:

(1) Absolute Gradient:

$$F_{ag} = \sum_i \sum_j |\text{Threshold}(I(i, j+1) - I(i, j), T)|,$$

$$\text{where Threshold}(x, T) = \begin{cases} x, & x \geq T \\ 0, & x < 0 \end{cases}$$

(2) Squared Gradient:

$$F_{sg} = \sum_i \sum_j \text{Threshold}((I(i, j+1) - I(i, j))^2, T),$$

$$\text{where Threshold}(x, T) = \begin{cases} x, & x \geq T \\ 0, & x < 0 \end{cases}$$

(3) Brenner Gradient:

$$F_{bg} = \sum_i \sum_j \text{Threshold}((I(i, j+2) - I(i, j))^2, T),$$

$$\text{where Threshold}(x, T) = \begin{cases} x, & x \geq T \\ 0, & x < 0. \end{cases}$$

(4) Content:

$$F_{content} = \sum_i \sum_j \text{Threshold}(I(i, j)),$$

$$\text{where Threshold}(x, T) = \begin{cases} x, & x \geq T \\ 0, & x < 0 \end{cases}$$

(5) Pixel Count:

$$F_{pc} = \sum_i \sum_j PCount(I(i, j), T), \text{ where}$$

$$PCount(x, T) = \begin{cases} 1, & x \leq T \\ 0, & x > T \end{cases}$$

(6) Image Power:

$$F_{power} = \sum_i \sum_j \text{Threshold}(I(i, j)^2),$$

$$\text{where Threshold}(x, T) = \begin{cases} x, & x \geq T \\ 0, & x < 0 \end{cases}$$

(7) Tenenbaum Gradient:

$$F_{Tg} = \sum_i \sum_j (S_x(i, j)^2 + S_y(i, j)^2),$$

where $S_x$ and $S_y$ are the convoluted images with Sobel operators.

(8) Energy Laplace:

$$F_{eL} = \sum_i \sum_j L(i, j)^2$$

where $L$ is the convoluted image with Laplace mask:

$$\begin{bmatrix} -1 & -4 & -1 \\ -4 & 20 & -4 \\ -1 & -4 & -1 \end{bmatrix}$$

(9) Variance:

$$F_{var} = \frac{1}{H \cdot W} \sum_i \sum_j (I(i, j) - \bar{I})^2$$

(10) Normalized Variance:

$$F_{nvar} = \frac{1}{H \cdot W \cdot \bar{I}} \sum_i \sum_j (I(i, j) - \bar{I})^2$$

(11) Autocorrelation:

$$F_{acor} = \sum_i \sum_j I(i, j) \cdot I(i, j+1) - \sum_i \sum_j I(i, j) \cdot I(i, j+2)$$

(12) Standard Deviation Based Correlation:

$$F_{sdcor} = \sum_i \sum_j I(i, j) \cdot I(i, j+1) - H \cdot W \cdot \bar{I}^2$$

(13) Range:

$$F_{range} = \max\{i | \text{hist}(i) > 0\} - \min\{i | \text{hist}(i) > 0\}, \text{ where hist}$$
$(i)$ is the number of pixels of intensity $i$.

(14) Entropy:

$$F_{entropy} = -\sum_i p_i \cdot \log_2(p_i), \text{ where}$$

$$p_i = \frac{\text{hist}(i)}{(H \cdot W)}$$

(15) Modified Absolute Gradient (MAG):

$$F_{mag} = \sum_i \sum_j \text{ModAbsThr}(i, j, T)$$

where $\text{ModAbsThr}(i, j, T) =$ $\text{Threshold}(|I(i, j+1) - I(i, j)|, T) + \text{Threshold}(|I(i+1, j) - I(i, j)|, T)$, where $\text{Threshold}(x, T) = \begin{cases} x, & x \geq T \\ 0, & x < 0. \end{cases}$

(16) Modified Absolute Gradient Count:

$$F_{magc} = \sum_i \sum_j \text{Count}(i, j, T) \text{ where}$$

$\text{Count}(i, j, T) =$ $\begin{cases} 1, & |I(i, j+1) - I(i, j)| \geq T \text{ OR } |I(i+1, j) - I(i, j)| \geq T \\ 0, & \text{otherwise.} \end{cases}$

(17) Filtered Modified Absolute Gradient:

$$F_{fmag} = \sum_i \sum_j \begin{cases} \text{ModAbsThr}(i, j, T), & \text{Count}(i, j, T) = 1 \text{ AND} \\ & \text{Median}(i, j, T) \geq 4 \\ 0, & \text{otherwise} \end{cases}$$

where $\text{ModAbsThr}(i, j, T) = \text{Threshold}(|I(i, j+1) - I(i, j)|, T) +$ $\text{Threshold}(|I(i+1, j) - I(i, j)|, T)$, $\text{Threhsold}(x, T) = \begin{cases} x, & x \geq T \\ 0, & x < 0, \end{cases}$ $\text{Count}(i, j, T) =$ $\begin{cases} 1, & |I(i, j+1) - I(i, j)| \geq T \text{ OR } |I(i+1, j) - I(i, j)| \geq T \\ 0, & \text{otherwise,} \end{cases}$ and $\text{Median}(i, j, T) = \text{Count}(i-1, j-1, T) + \text{Count}(i-1, j,$ $T) + \text{Count}(i-1, j+1, T) + \text{Count}(i, j-1, T) +$ $\text{Count}(i, j+1, T) + \text{Count}(i+1, j-1, T) +$ $\text{Count}(i+1, j, T) + \text{Count}(i+1, j+1, T)$.

(18) Filtered Modified Absolute Gradient Count:

$$F_{fmagc} = \sum_i \sum_j \begin{cases} 1, & \text{Count}(i, j, T) = 1 \text{ AND Median}(i, j, T) \geq 4 \\ 0, & \text{otherwise,} \end{cases}$$

where $\text{Count}(i, j, T) =$ $\begin{cases} 1, & |I(i, j+1) - I(i, j)| \geq T \text{ OR } |I(i+1, j) - I(i, j)| \geq T \\ 0, & \text{otherwise,} \end{cases}$ and $\text{Median}(i, j, T) = \text{Count}(i-1, j-1, T) +$ $\text{Count}(i-1, j, T) + \text{Count}(i-1, j+1, T) +$ $\text{Count}(i, j-1, T) + \text{Count}(i, j+1, T) + \text{Count}(i+1,$ $j-1, T) + \text{Count}(i+1, j, T) + \text{Count}(i+1, j+1, T)$.

Using a Z-stack of images as input, each of the above 18 functions generated a focus curve.

Acquisition of Z-stacks of images started at the optical plane above the top surface of the tissue and proceeded to a focal plane below the bottom surface. A low incremental step-size (1 μm) through the Z-axis ensured identification of the boundary between unfocused and focused regions within an acceptable error rate. For locating the depth of focus of a tissue surface, the just out of focus image was defined as the boundary between unfocused and focused regions, with no interpolation between images.

For the example studies, an automated surface location algorithm was performed to locate the top and bottom tissue surfaces of a Z-stack of images using a specified focus function. The algorithm was repeated for each of the 18 equations.

The algorithm uses a training set of Z-stacks with manually determined tissue surfaces to optimize the focus function threshold parameters. The Nelder Mead simplex optimization method was used to optimize the two dimensional parameter space for the thresholded functions. The non-thresholded functions were optimized using the golden ration optimization method because only a single dimensional parameter space was needed to be optimized.

Once the algorithm was trained and the optimized thresholds determined, Z-stacks were analyzed to find the top and bottom focal planes for automatic section thickness determination. The automated surface locating algorithm started at the top of the Z-stack and moved down the Z-stack one image at a time. Focus of the first image was assessed over the trained focus threshold, and repeated for each consecutive image with each previous image designated as the just-out-of-focus optical plane, i.e., the top surface boundary. Second, the algorithm started from the bottom of the Z-stack and moved up the Z-stack, one image at a time, until the first image with focus measure over the trained focus threshold located, with the previous image designated as the bottom tissue surface boundary. Except for the first image on either side of the in-focus region, no images within the in-focus region were analyzed.

It should be understood that the focus function studies here are directed to locating the just-out-of-focus planes, and not the optical plane of peak focus. The approaches directed to the optical plane of peak focus are based on the idea that focus functions behave like Gaussian curves near their peaks; and are based on the knowledge that the logarithm of a Gaussian is quadratic, enable fitting of a parabolic curve between adjacent images to determine optimal peak focus along the focus curve. In contrast, the just-out-of-focus area of the focus curve targeted by the present study does not approach a Gaussian or any other well-defined function; therefore, no interpolation or curve fitting was carried out.

To locate the just out of focus images, an ideal focus curve differentiates three regions in each Z-stack:

1) The unfocused images above the tissue sample.
2) The in-focus images within the tissue sample.
3) The unfocused images below the tissue sample.

The two unfocused regions on either side of the in focus region were assumed to perform in a similar manner, i.e., these regions of the focus curve response would be zero with no points of focus in the image. In practice, these regions would be at, or close to, a minimum and relatively flat compared to the in-focus region, with no assumption that these regions would be monotonic. The only requirement for an in-focus region is that the bounding images would have a higher focus measure than every image from the unfocused regions. Finally, there was no assumption of unimodality in the region and no requirement for all these images to yield higher focus measures than the unfocused images.

All functions were optimized over the training set to minimize deviation from the top and bottom surfaces located in a manual manner (i.e., ground truth). The two vertical bars in every figure represent ground truth that separate each focus curve into three regions: the middle region between the ground truth bars, that is, the in-focus region; and the two out-of-focus regions on either side of the in focus region that include the ground truth bars. When possible to select correct focus thresholds, the range of acceptable thresholds is shaded horizontally across the figure to separate the focus curve at the ground truth bars. In FIGS. 8A-8R, FIGS. 8A, 8B, 8C, 8H, 8O, 8P, 8Q, and 8R depict the range of threshold values that correctly identify the surface depth by partitioning the Z-stack into a focused region bounded by an unfocused region on either side.

The initial testing of equations 1-14 show that the thresholded absolute gradient was superior to the others in determining tissue surface location in terms of overall rank. The equations 15-18 are four focus functions in accordance with certain embodiments of the invention and provide even greater performance than the thresholded absolute gradient. As illustrated by the focus curves of FIGS. 8A-8R resulting from applying the eighteen focus functions, the five used in certain embodiments of the invention provide the best results in identifying the just-out-of-focus focal planes.

Of the eighteen focus functions analyzed, the thresholded gradient based functions (FIGS. 8A, 8B, 8C, 8O, 8P, 8Q, and 8R) were the only functions to achieve the performance requirements of locating tissue surfaces with an average tolerance of 1.0 μm relative to ground truth. These seven focus functions were each independently incorporated into the automated surface location algorithm, and each trained to find the top and bottom tissue surfaces within an average tolerance of 1.0 μm using an arbitrarily selected training set given in Table 3. With trained threshold parameters, all seven functions identified the top and bottom tissue surfaces within 1.0 μm on a test set of similar Z-stacks, test set #1 (Table 4); and on a test set #2 that represents a set of Z-stacks from a different rat brain case study (Table 5).

TABLE 3

Automated Focus Determination Training Set Optimization

| Eq. | Function | Contrast Threshold | Focus Threshold | Average Error from G.T. (μm) | Rank | Standard Deviation from G.T. (μm) | Rank |
|---|---|---|---|---|---|---|---|
| (1) | Absolute Gradient | 16 | 700 | 0.72 | 1 | 0.80 | 6 |
| (2) | Squared Gradient | 119 | 197,878 | 0.89 | 7 | 1.56 | 7 |
| (3) | Brenner Gradient | 486 | 130,444 | 0.75 | 4 | 0.79 | 5 |
| (15) | Modified Absolute Gradient | 18 | 239 | 0.72 | 1 | 0.69 | 3 |
| (16) | Modified Absolute Gradient Count | 18 | 18 | 0.75 | 4 | 0.68 | 1 |
| (17) | Filtered Modified Absolute Gradient | 17 | 118 | 0.72 | 1 | 0.77 | 4 |
| (18) | Filtered Modified Absolute Gradient Count | 16 | 10 | 0.75 | 4 | 0.68 | 1 |
| (4) | Content | 96 | 159,139 | 4.22 | 16 | 2.76 | 17 |
| (5) | Pixel Count | 42 | 13,429 | 2.56 | 11 | 2.65 | 14 |
| (6) | Image Power | 80 | 695,994,640 | 4.33 | 17 | 2.69 | 15 |
| (7) | Tenenbaum Gradient | N/A | 517,555,008 | 1.50 | 10 | 2.13 | 8 |
| (8) | Energy Laplace | N/A | 393,364,455 | 1.17 | 8 | 2.23 | 10 |
| (9) | Variance | N/A | 948 | 2.86 | 12 | 2.63 | 13 |
| (10) | Normal Variance | N/A | 89,505 | 2.97 | 13 | 2.51 | 12 |
| (11) | Autocorrelation | N/A | 6,027,949 | 1.44 | 9 | 2.15 | 9 |
| (12) | Standard Deviation Based Autocorrelation | N/A | 758,447,304 | 4.50 | 18 | 2.69 | 16 |
| (13) | Range | N/A | 180 | 3.31 | 15 | 2.95 | 18 |
| (14) | Entropy | N/A | 6.8484 | 3.00 | 14 | 2.44 | 11 |

TABLE 4

Automated Focus Determination, Test Set #1

| Eq. | Function | Contrast Threshold | Focus Threshold | Average Error from G.T. (μm) | Rank | Standard Deviation from G.T. (μm) | Rank |
|---|---|---|---|---|---|---|---|
| (1) | Absolute Gradient | 16 | 700 | 0.63 | 4 | 0.42 | 2 |
| (2) | Squared Gradient | 119 | 197,239 | 0.69 | 6 | 0.53 | 7 |
| (3) | Brenner Gradient | 486 | 130,341 | 0.78 | 8 | 0.48 | 6 |
| (15) | Modified Absolute Gradient | 18 | 230 | 0.66 | 5 | 0.41 | 1 |
| (16) | Modified Absolute Gradient Count | 18 | 18 | 0.56 | 1 | 0.43 | 3 |
| (17) | Filtered Modified Absolute Gradient | 17 | 118 | 0.59 | 3 | 0.43 | 3 |
| (18) | Filtered Modified Absolute Gradient Count | 16 | 20 | 0.56 | 1 | 0.43 | 3 |

TABLE 5

Automated Focus Determination Test Set #2

| Eq. | Function | Contrast Threshold | Focus Threshold | Average Error from G.T. (μm) | Rank | Standard Deviation from G.T. (μm) | Rank |
|---|---|---|---|---|---|---|---|
| (1) | Absolute Gradient | 16 | 700 | 0.42 | 2 | 0.71 | 6 |
| (2) | Squared Gradient | 119 | 197,239 | 1.00 | 7 | 0.71 | 6 |
| (3) | Brenner Gradient | 486 | 130,341 | 0.53 | 6 | 0.68 | 5 |
| (15) | Modified Absolute Gradient | 18 | 230 | 0.47 | 4 | 0.65 | 1 |
| (16) | Modified Absolute Gradient Count | 18 | 18 | 0.39 | 1 | 0.65 | 1 |
| (17) | Filtered Modified Absolute Gradient | 17 | 118 | 0.47 | 4 | 0.65 | 1 |
| (18) | Filtered Modified Absolute Gradient Count | 16 | 20 | 0.44 | 3 | 0.67 | 4 |

Ranking the algorithms by both average error rate as well as standard deviation from the ground truth showed that the MAGC function outperformed the others by finding tissue section surfaces within 0.56 μm on average for test set #1, and within 0.39 μm on average for test set #2. Surpassing the tolerance goal of ±1.0 μm for each surface, tissue thickness was also determined within ±1.0 μm on average. Because two surface locations for each Z-stack are used to determine each section thickness measure, the two test sets were combined to determine tissue thickness. On the resulting set of 34 tissues samples, six of the previously mentioned seven thresholded gradient functions yielded an error rate of less than 1.0 μm (Table 6). Once again, the MAGC function had the lowest error rate (0.76 μm).

TABLE 6

Automated Tissue Thickness Determination for Test Sets #1 and #2 Combined

| Eq. | Function | Contrast Threshold | Focus Threshold | Average Error from G.T. (μm) | Rank | Standard Deviation from G.T. (μm) | Rank |
|---|---|---|---|---|---|---|---|
| (1) | Absolute Gradient | 16 | 700 | 0.85 | 3 | 1.13 | 6 |
| (2) | Squared Gradient | 119 | 197,239 | 1.41 | 7 | 1.13 | 6 |
| (3) | Brenner Gradient | 486 | 130,341 | 0.94 | 5 | 1.04 | 5 |
| (15) | Modified Absolute Gradient | 18 | 230 | 0.94 | 5 | 0.98 | 2 |
| (16) | Modified Absolute Gradient Count | 18 | 18 | 0.76 | 1 | 1.00 | 4 |
| (17) | Filtered Modified Absolute Gradient | 17 | 118 | 0.88 | 4 | 0.96 | 1 |
| (18) | Filtered Modified Absolute Gradient Count | 16 | 20 | 0.82 | 2 | 0.99 | 3 |

Supervised sets of Z-stack images stored as portable gray scale maps (pgm files) on hard disk were used to develop a training method to optimize the automated surface location algorithm. The automation of the thresholded gradient functions required selection of two thresholds: 1) the pixel-to-pixel contrast threshold to determine whether to include the contrast between two pixels in the function summation; and 2) the total image focus threshold to decide whether an image is in focus. Since the Nelder Mead optimization outcome is dependent on the initial selection of simplex coordinates, the method was run three times for each focus function, with a different initialization each time. The automated surface location algorithm used each of the hundreds of threshold pairs selected by Nelder Mead with each focus function to locate 36 tissue surfaces within 18 Z-stacks consisting of a total of 480 images. This analysis led to the seven focus functions that located correct tissue surfaces within the desired error rate tolerance after application of the optimized thresholds (the seven function having plots shown in FIGS. 8A, 8B, 8C, 8O, 8P, 8Q, and 8R).

Test set #2, a set of rat brain coronal sections taken from a different study than the rat brain coronal sections from the training set, was used to analyze the robustness of the optimized thresholds. Importantly, both the histochemical stain (cresyl violet) and reference space (hippocampus) for sections in test set #2 differed markedly in appearance from that of the training set obtained from TH-immunostained sections through the substantia nigra in test set #1. Nonetheless, using threshold parameters optimized on the training set, the same seven focus function that performed well on test set #1 performed to the same level on test set #2 (see Table 5), with the MAGC function outperforming others with an average error rate of 0.76 μm.

To test the statistical significance of these findings, the success rate of all seventeen focus functions were compared to the MAG. Success was defined as automatic identification of a tissue surface within 1 μm of the tissue surface location determined by the user in a manual manner. The seven thresholded gradient functions attained this goal, while the remaining functions did not. According to the McNemar chisquared test, there were no statistically significant differences between the MAGC function and the other six thresholded gradient functions with respect to location of tissue surfaces within 1 μm of the correct location (see Table 7). Furthermore, the paired t-test confirmed that the MAGC function was statistically different than all the other gradient functions with regard to accurate determinations of tissue surfaces locations with a confidence interval of 95% compared to the mean difference from ground truth. Thus, the MAGC function found the correct tissue thickness relative to ground truth in a more consistent manner than all other functions, with a confidence interval of 99% or more (see Table 9).

TABLE 7

Paired t-Test Measuring Statistical Significance
Paired t-Test with Likelihood [confidence interval (CI, %)] That Modified Absolute Gradient Count (MAGC) Is Statistically Different Than Other Thresholded Gradient Functions with regard to Accurate Location of Tissue Surfaces

| Eq. | Algorithm | Training t (35 df) | CI | Test Set 1 t 31 df | CI | Test Set 2 t (35 df) | CI | Thickness Test Set t (33 df) | CI |
|---|---|---|---|---|---|---|---|---|---|
| (1) | Absolute Gradient | 2.02 | 97 | 2.10 | 98 | 2.38 | 99 | 3.02 | 100 |
| (2) | Squared Gradient | 3.02 | 100 | 4.00 | 100 | 7.32 | 100 | 8.07 | 100 |
| (3) | Brenner Gradient | 2.71 | 99 | 4.61 | 100 | 3.42 | 100 | 4.31 | 100 |
| (15) | Modified Absolute Gradient | 1.43 | 92 | 1.44 | 92 | 2.09 | 98 | 2.66 | 99 |
| (17) | Filtered Modified Absolute Gradient | 1.00 | 84 | 1.79 | 96 | 1.78 | 96 | 2.66 | 99 |
| (18) | Filtered Modified Absolute Gradient Count | 1.78 | 96 | 1.79 | 96 | 2.38 | 99 | 3.19 | 100 | df = degrees of freedom

TABLE 8

Distribution of Deviation on Training Set
Distribution of Deviation of
Automated Surface Location from Manual Surface Location
Training Set of 18 Z-stacks (36 Surfaces Located)

| | | 0 μm | | 1 μm | | 2 μm | | >2 μm | |
|---|---|---|---|---|---|---|---|---|---|
| Eq. | Function | Count | % | Count | % | Count | % | Count | % |
| (1) | Absolute Gradient | 17 | 47 | 13 | 36 | 5 | 14 | 1 | 3 |
| (2) | Squared Gradient | 17 | 47 | 14 | 39 | 3 | 8 | 2 | 6 |
| (3) | Brenner Gradient | 16 | 44 | 14 | 39 | 5 | 14 | 1 | 3 |
| (15) | Modified Absolute Gradient | 15 | 42 | 16 | 44 | 5 | 14 | 0 | 0 |
| (16) | Modified Absolute Gradient Count | 14 | 39 | 17 | 47 | 5 | 14 | 0 | 0 |
| (17) | Filtered Modified Absolute Gradient | 16 | 44 | 15 | 42 | 4 | 11 | 1 | 3 |

TABLE 8-continued

Distribution of Deviation on Training Set
Distribution of Deviation of
Automated Surface Location from Manual Surface Location
Training Set of 18 Z-stacks (36 Surfaces Located)

| | | 0 μm | | 1 μm | | 2 μm | | >2 μm | |
|---|---|---|---|---|---|---|---|---|---|
| Eq. | Function | Count | % | Count | % | Count | % | Count | % |
| (18) | Filtered Modified Absolute Gradient Count | 14 | 39 | 17 | 47 | 5 | 14 | 0 | 0 |

The distribution of the deviation of the automated location of tissue surfaces from the ground truth is shown in Table 9 through Table 12. The deviation is the positive difference between the automated surface location algorithms determination of surface location and the ground truth. This difference is measured in whole micrometers. Since the step size through the Z-stacks was 1 μm, this difference is the number of images from the correct just out of focus image returned by the algorithm. On test set #1 and test set #2 the MAGC function was never more than two images away (i.e., within 2 μm from the ground truth). 94% of the tissue surfaces determined by the MAGC function were within a single image from the ground truth. For thickness determination, this was not the case, since measuring thickness requires measurement of both the upper and lower surfaces, and therefore requires a higher tolerance level. Nonetheless, tissue thickness was determined within 1 μm by the MAGC function 78% of the time, and never greater than 3 μm from than ground truth.

TABLE 9

Distribution of Deviation on Test Set #1
Distribution of Deviation of
Automated Surface Location from Manual Surface Location
Test Set #1: 16 Z-stacks (32 Surfaces Located)

| | | 0 μM | | 1 μm | | 2 μm | | >2 μM | |
|---|---|---|---|---|---|---|---|---|---|
| Eq. | Function | Count | % | Count | % | Count | % | Count | % |
| (1) | Absolute Gradient | 15 | 47 | 14 | 44 | 3 | 9 | 0 | 0 |
| (2) | Squared Gradient | 15 | 47 | 12 | 38 | 5 | 16 | 0 | 0 |
| (3) | Brenner Gradient | 12 | 38 | 15 | 47 | 5 | 16 | 0 | 0 |
| (15) | Modified Absolute Gradient | 14 | 44 | 15 | 47 | 3 | 9 | 0 | 0 |
| (16) | Modified Absolute Gradient Count | 17 | 53 | 12 | 38 | 3 | 9 | 0 | 0 |
| (17) | Filtered Modified Absolute Gradient | 16 | 50 | 13 | 41 | 3 | 9 | 0 | 0 |
| (18) | Filtered Modified Absolute Gradient Count | 17 | 53 | 12 | 38 | 3 | 9 | 0 | 0 |

TABLE 10

Distribution of Deviation on Test Set #2
Distribution of Deviation of
Automated Surface Location from Manual Surface Location
Test Set #2: 18 Z-stacks (36 Surfaces Located)

| | | 0 μm | | 1 μm | | 2 μm | | >2 μm | |
|---|---|---|---|---|---|---|---|---|---|
| Eq. | Function | Count | % | Count | % | Count | % | Count | % |
| (1) | Absolute Gradient | 23 | 64 | 12 | 33 | 0 | 0 | 1 | 3 |
| (2) | Squared Gradient | 9 | 25 | 19 | 53 | 7 | 19 | 1 | 3 |
| (3) | Brenner Gradient | 19 | 53 | 16 | 44 | 0 | 0 | 1 | 3 |
| (15) | Modified Absolute Gradient | 21 | 58 | 13 | 36 | 2 | 6 | 0 | 0 |
| (16) | Modified Absolute Gradient Count | 23 | 64 | 12 | 33 | 1 | 3 | 0 | 0 |
| (17) | Filtered Modified Absolute Gradient | 21 | 58 | 13 | 36 | 2 | 6 | 0 | 0 |
| (18) | Filtered Modified Absolute Gradient Count | 22 | 61 | 12 | 33 | 2 | 6 | 0 | 0 |

TABLE 11

Distribution of Deviation on Combined Test Sets
Distribution of Deviation of Automated Tissue Thickness Determination from
Manual Thickness Determination
Combined Test Sets #1 and #2: 34 Z-stacks

| Eq. | Function | 0 μm Count | % | 1 μm Count | % | 2 μm Count | % | >2 μm Count | % |
|---|---|---|---|---|---|---|---|---|---|
| (1) | Absolute Gradient | 16 | 47 | 11 | 32 | 4 | 12 | 3 | 9 |
| (2) | Squared Gradient | 5 | 15 | 17 | 50 | 7 | 21 | 5 | 15 |
| (3) | Brenner Gradient | 12 | 35 | 16 | 47 | 3 | 9 | 3 | 9 |
| (15) | Modified Absolute Gradient | 13 | 38 | 12 | 35 | 7 | 21 | 2 | 6 |
| (16) | Modified Absolute Gradient Count | 16 | 47 | 12 | 35 | 4 | 12 | 2 | 6 |
| (17) | Filtered Modified Absolute Gradient | 13 | 38 | 14 | 41 | 5 | 15 | 2 | 6 |
| (18) | Filtered Modified Absolute Gradient Count | 14 | 41 | 14 | 41 | 4 | 12 | 2 | 6 |

TABLE 12

Distribution of Deviation on Combined Test Sets
Distribution of Deviation of Automated Tissue Thickness Determination from
Manual Thickness Determination
Combined Test Sets #1 and #2: 34 Z-stacks

| Eq. | Function | 0 μm Count | % | 1 μm Count | % | 2 μm Count | % | >2 μm Count | % |
|---|---|---|---|---|---|---|---|---|---|
| (1) | Absolute Gradient | 16 | 47 | 11 | 32 | 4 | 12 | 3 | 9 |
| (2) | Squared Gradient | 5 | 15 | 17 | 50 | 7 | 21 | 5 | 15 |
| (3) | Brenner Gradient | 12 | 35 | 16 | 47 | 3 | 9 | 3 | 9 |
| (15) | Modified Absolute Gradient | 13 | 38 | 12 | 35 | 7 | 21 | 2 | 6 |
| (16) | Modified Absolute Gradient Count | 16 | 47 | 12 | 35 | 4 | 12 | 2 | 6 |
| (17) | Filtered Modified Absolute Gradient | 13 | 38 | 14 | 41 | 5 | 15 | 2 | 6 |
| (18) | Filtered Modified Absolute Gradient Count | 14 | 41 | 14 | 41 | 4 | 12 | 2 | 6 |

According to the experimental studies outlined above, the computational complexity to determine focus of an image using the modified functions (equations 15-18) is $O(n^2)$, where n is the number of rows or columns of the image. For rotational invariance, the vertical comparison is performed in parallel with the horizontal comparison with no increase in complexity. The median filter, however, involves a second pass through the image raster, with the second pass pipelined one row and column behind the first pass, with only a slight constant time increase. With current processing speeds of standard computers, a Z-stack can be captured and analyzed in real time, with the step motor speed of the automated stage as the time limiting factor.

Example 2

Automatic Identification and Counting of Objects of Interest

Experimental studies were carried out to show automatic identification and counting of the number of objects of interest in a stack of images within a region of interest (ROI) marked by a user on a single tissue section. As described with respect to FIGS. 4A-4B, 5, 6A-6E, and 7A-7E, the automatic detection of cells in a tissue section can be carried out by a combination of color processing and gray level processing of the images of a tissue section.

To evaluate the overall performance of the process, a dataset of thirty stacks (sets of images) was used. The source of input usually are biological tissues sectioned into a series of 8-12 slices and stained to reveal biological objects of interest (cells, fibers, blood vessels). For the experimental studies, the source of input was rat brain tissue, cut into sections with a preprocessing thickness of 40 μm, and post-processing thickness of about 17 μm. All the data used was collected from the same animal (rat). Fifteen stacks, with five sets of images from each section were used for training. The test set comprised of the remaining fifteen stacks.

In color processing, the training stacks were used to obtain a standard deviation for each channel in addition to the average color values. This standard deviation was used to determine the distance measure. These values where used for test sets to obtain color processed images. The region growing operation required tuning of a parameter, the number of pixels required to form a region. Ground truth on the images indicated that the number of pixels typically present in the cells fall into the range of 500 to 33000. The thresholding technique employed isolates as many cells as possible but there are still some cells that are occluded.

Figure 9A:
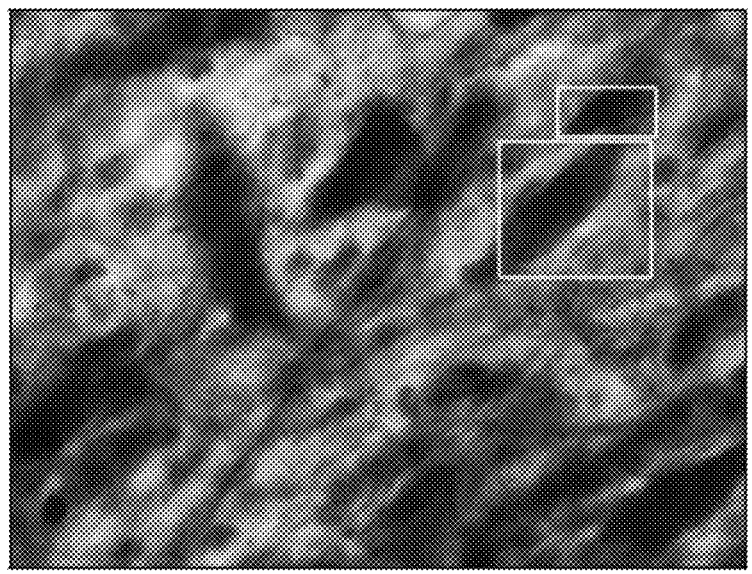
Figure 9B:
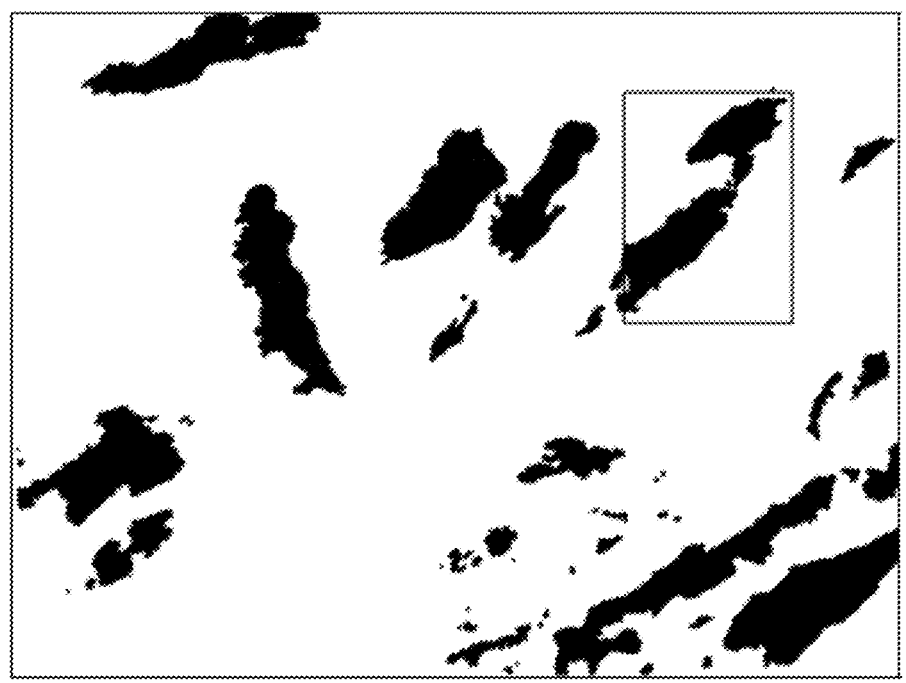

Table 13 contains the results obtained for 30 volumes. The first column of the table represents the percentage of cells detected by the method described with respect to FIGS. 6A-6E and 7A-7D. The second column presents the percentage of the total cells detected as one cell, but originally are two cells merged as one. FIG. 9A shows one original image illustrating this case, with two cells highlighted; and FIG. 9B shows these two cells identified as a single cell. The third column is the percentage of three cells which are identified as a single cell. The fourth column indicates the number of regions that were not cells but identified as cells. The last column provides the percentage of the cells that were not identified at each depth.

TABLE 13

| | Overall cell detection rate | Overall detection % of two cells detected as one | Overall detection % of three cells detected as one | Overall detection % of extra regions | Overall % of missed cells per slice |
|---|---|---|---|---|---|
| Training Set | 95.32 | 5.49 | 1.37 | 33.44 | 5.68 |
| Test Set | 93.27 | 7.31 | 0.92 | 37.32 | 6.73 |

By using two levels of segmentation in accordance with certain embodiments of the invention, it is possible to provide an automated object count by associating a unique identity with biological objects. Based on the results of testing thirty volumes of data, over 93% positive detection rate was achieved.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A computerized stereology system, comprising:
an imager for capturing a Z-stack of images of a three-dimensional (3D) object, the Z-stack of images being a sequence of images of the 3D object captured in increments having a step size along a z-axis of the 3D object; and
a processor configured to identify a top and a bottom boundary of each image of the Z-stack by performing a depth of focus analysis to determine just-out-of-focus focal planes of images within the Z-stack, the just-out-of-focus focal planes establishing boundaries with no interpolation between images within the z-stack of images.

2. The computerized stereology system according to claim 1, wherein performing the depth of focus analysis comprises applying a focus function to each image of the Z-stack, the focus function being a thresholded focus function; and
wherein only a top-most and a bottom-most image is analyzed within an in-focus region.

3. The computerized stereology system according to claim 2, wherein the focus function is $$\sum_i \sum_j |\text{Threshold}(I(i, j+1) - I(i, j), T)|,$$

where $\text{Threshold}(x, T) = \begin{cases} x, & x \geq T \\ 0, & x < 0 \end{cases}$.

4. The computerized stereology system according to claim 2, wherein the focus function is $$\sum_i \sum_j \text{ModAbsThr}(i, j, T), \text{ where}$$

$\text{ModAbsThr}(i, j, T) =$ $\text{Threshold}(|I(i, j+1) - I(i, j)|, T) + \text{Threshold}(|I(i+1, j) - I(i, j)|, T),$ where $\text{Threshold}(x, T) = \begin{cases} x, & x \geq T \\ 0, & x < 0 \end{cases}$.

5. The computerized stereology system according to claim 2, wherein the focus function is $$\sum_i \sum_j \text{Count}(i, j, T), \text{ where}$$

$\text{Count}(i, j, T) =$ $\begin{cases} 1, & |I(i, j+1) - I(i, j)| \geq T \text{ OR } |I(i+1, j) - I(i, j)| \geq T \\ 0, & \text{otherwise.} \end{cases}$ 6. The computerized stereology system according to claim 2, wherein the focus function is $$\sum_i \sum_j \begin{cases} \text{ModAbsThr}(i, jT), & \begin{aligned} &\text{Count}(i, j, T) = 1 \text{ AND} \\ &\text{Median}(i, j, T) \geq 4 \end{aligned} \\ 0, & \text{otherwise,} \end{cases}$$

where $\text{ModAbsThr}(i, j, T) = \text{Threshold}(|I(i, j+1) - I(i, j)|, T) +$
$\text{Threshold}(|I(i+1, j) - I(i, j)|, T),$ $\text{Threshold}(x, T) = \begin{cases} x, & x \geq T \\ 0, & x < 0, \end{cases}$ $\text{Count}(i, j, T) =$ $\begin{cases} 1, & |I(i, j+1) - I(i, j)| \geq T \text{ OR } |I(i+1, j) - I(i, j)| \geq T \\ 0, & \text{otherwise,} \end{cases}$ and $\text{Median}(i, j, T) = \text{Count}(i-1, j-1, T) + \text{Count}(i-1, j,$
$T) + \text{Count}(i-1, j+1, T) + \text{Count}(i, j-1, T) +$
$\text{Count}(i, j+1, T) + \text{Count}(i+1, j-1, T) +$
$\text{Count}(i+1, j, T) + \text{Count}(i+1, j+1, T).$ 7. The computerized stereology system according to claim 2, wherein the focus function is $$\sum_i \sum_j \begin{cases} 1, & \text{Count}(i, j, T) = 1 \text{ AND Median}(i, j, T) \geq 4 \\ 0, & \text{otherwise,} \end{cases}$$

where $\text{Count}(i, j, T) =$ $$\begin{cases} 1, & |I(i, j+1) - I(i, j)| \geq T \text{ OR } |I(i+1, j) - I(i, j)| \geq T \\ 0, & \text{otherwise,} \end{cases}$$

and $\text{Median}(i, j, T) = \text{Count}(i-1, j-1, T) + \text{Count}(i-1, j, T) +$
$\qquad \text{Count}(i-1, j+1, T) + \text{Count}(i, j-1, T) +$
$\qquad \text{Count}(i, j+1, T) + \text{Count}(i+1, j-1, T) +$
$\qquad \text{Count}(i+1, j, T) + \text{Count}(i+1, j+1, T).$ 8. The computerized stereology system according to claim 2, wherein applying the focus function comprises:
   starting at the top of the Z-stack and progressing through the Z-stack one image at a time with each previous image designated as the just-out-of-focus optical plane providing a top surface boundary; and
   starting at the bottom of the Z-stack and progressing through the Z-stack one image at a time with the previous image designated as the just-out-of-focus optical plane providing a bottom surface boundary.

9. The computerized stereology system according to claim 2, further comprising training and optimizing the focus function before applying the focus function by:
   providing a training set of Z-stack images with manually determined surfaces; and
   optimizing a two-dimensional parameter space to optimize threshold parameters of the focus function.

10. The computerized stereology system according to claim 1, wherein the processor is further configured to perform color processing to identify biological features of interest within the top boundary and the bottom boundary of each image and perform gray level processing to count the biological features of interest.

11. The computerized stereology system according to claim 10, wherein the color processing and gray level processing comprises:
   performing color space conversion and color thresholding to generate a segmented image;
   refining the segmented image by applying a filter to generate a refined image;
   converting the refined image to a gray level image;
   performing iterative thresholding of the gray level image to generate a binary image;
   identifying regions in the binary image to draw a boundary box for each cell representing a biological feature of interest; and
   producing a cell count.

12. The computerized stereology system according to claim 11, wherein the color space conversion comprises converting red, green, and blue to hue and saturation; and the color thresholding comprises segmenting the image into foreground-containing cells that have a desired color and background containing a remainder of the image.

13. The computerized stereology system according to claim 11, wherein applying the filter to generate the refined image comprises using a fill-hole algorithm that fills by a connected component analysis.

14. A computer readable medium having instructions stored thereon for performing a method of automatic section thickness determination, the method comprising the steps of:
   identifying a top and bottom boundary of each image of a Z-stack of images by performing a depth of focus analysis to determine just-out-of-focus focal planes of images within the Z-stack, the just-out-of-focus focal planes establishing boundaries with no interpolation between images within the Z-stack of images.

15. The computer readable medium system according to claim 14, wherein performing the depth of focus analysis comprises applying a focus function to each image of the Z-stack, the focus function being a thresholded focus function; and
   wherein only a top-most and a bottom-most image is analyzed within an in-focus region.

16. The computer readable medium according to claim 15, wherein the focus function is $$\sum_i \sum_j |\text{Threshold}(I(i, j+1) - I(i, j), T)|,$$

where $\text{Threshold}(x, T) = \begin{cases} x, & x \geq T \\ 0, & x < 0. \end{cases}$ 17. The computer readable medium according to claim 15, wherein the focus function is $$\sum_i \sum_j \text{ModAbsThr}(i, j, T),$$

where $\text{ModAbsThr}(i, j, T) = \text{Threshold}(|I(i, j+1) - I(i, j)|, T) + \text{Threshold}(|I(i+1, j) - I(i, j)|, T),$
where $\text{Threshold}(x, T) = \begin{cases} x, & x \geq T \\ 0, & x < 0. \end{cases}$ 18. The computer readable medium according to claim 15, wherein the focus function is $$\sum_i \sum_j \text{Count}(i, j, T),$$

where $\text{Count}(i, j, T) =$ $$\begin{cases} 1, & |I(i, j+1) - I(i, j)| \geq T \text{ OR } |I(i+1, j) - I(i, j)| \geq T \\ 0, & \text{otherwise.} \end{cases}$$

19. The computer readable medium according to claim 15, wherein the focus function is:

$$\sum_i \sum_j \begin{cases} \text{ModAbsThr}(i, jT), & \begin{array}{l}\text{Count}(i, j, T) = 1 \text{ AND} \\ \text{Median}(i, j, T) \geq 4\end{array} \\ 0, & \text{otherwise,} \end{cases}$$

where $\text{ModAbsThr}(i, j, T) = \text{Threshold}(|I(i, j+1) - I(i, j)|, T) +$
$\qquad \text{Threshold}(|I(i+1, j) - I(i, j)|, T),$ -continued $$\text{Threshold}(x, T) = \begin{cases} x, & x \geq T \\ 0, & x < 0, \end{cases}$$

$$\text{Count}(i, j, T) = $$
$$\begin{cases} 1, & |I(i, j+1) - I(i, j)| \geq T \text{ OR } |I(i+1, j) - I(i, j)| \geq T, \text{ and} \\ 0, & \text{otherwise,} \end{cases}$$

$$\text{Median}(i, j, T) = \text{Count}(i-1, j-1, T) + \text{Count}(i-1, j, T) + $$
$$\text{Count}(i-1, j+1, T) + \text{Count}(i, j-1, T) + $$
$$\text{Count}(i, j+1, T) + \text{Count}(i+1, j-1, T) + $$
$$\text{Count}(i+1, j, T) + \text{Count}(i+1, j+1, T).$$

20. The non-transitory computer readable medium according to claim 15, wherein the focus function is $$\sum_i \sum_j \begin{cases} 1, & \text{Count}(i, j, T) = 1 \text{ AND Median}(i, j, T) \geq 4 \\ 0, & \text{otherwise,} \end{cases}$$

where $\text{Count}(i, j, T) =$ $$\begin{cases} 1, & |I(i, j+1) - I(i, j)| \geq T \text{ OR } |I(i+1, j) - I(i, j)| \geq T, \text{ and} \\ 0, & \text{otherwise} \end{cases}$$

$$\text{Median}(i, j, T) = \text{Count}(i-1, j-1, T) + \text{Count}(i-1, j, T) + $$
$$\text{Count}(i-1, j+1, T) + \text{Count}(i, j-1, T) + $$
$$\text{Count}(i, j+1, T) + \text{Count}(i+1, j-1, T) + $$
$$\text{Count}(i+1, j, T) + \text{Count}(i+1, j+1, T).$$

21. The computer readable medium according to claim 14, further having instructions stored thereon for performing a method of automatic quantification of objects within a section, the method comprising the steps of:
performing color space conversion and color thresholding to generate a segmented image;
refining the segmented image by applying a filter to generate a refined image;
converting the refined image to a gray level image;
performing iterative thresholding of the gray level image to generate a binary image;
identifying regions in the binary image to draw a boundary box for each cell representing a biological feature of interest; and
producing a cell count.

22. The computer readable medium according to claim 21, wherein the color space conversion comprises converting red, green, and blue to hue and saturation; and the color thresholding comprises segmenting the image into foreground-containing cells that have a desired color and background containing a remainder of the image.

23. The computer readable medium according to claim 21, wherein applying the filter to generate the refined image comprises using a fill-hole algorithm that fills by a connected component analysis.

\* \* \* \* \*